(12) United States Patent
Suga et al.

(10) Patent No.: US 9,180,906 B2
(45) Date of Patent: Nov. 10, 2015

(54) DRIVING APPARATUS

(75) Inventors: Yuuji Suga, Kariya (JP); Hiroshi Imai, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 503 days.

(21) Appl. No.: 13/611,092

(22) Filed: Sep. 12, 2012

(65) Prior Publication Data

US 2013/0099611 A1    Apr. 25, 2013

(30) Foreign Application Priority Data

Oct. 19, 2011    (JP) .................................. 2011-229639

(51) Int. Cl.
*H02K 5/22*    (2006.01)
*B62D 5/04*    (2006.01)
*H02K 11/00*    (2006.01)

(52) U.S. Cl.
CPC .............. *B62D 5/0406* (2013.01); *H02K 5/225* (2013.01); *H02K 11/0073* (2013.01)

(58) Field of Classification Search
CPC . B62D 5/0406; H02K 11/00; H02K 11/0073; H02K 5/225
USPC .......................................................... 310/71
See application file for complete search history.

(56) References Cited

U.S. PATENT DOCUMENTS

| | | | |
|---|---|---|---|
| 5,770,902 | A | 6/1998 | Batten et al. |
| 8,816,548 | B2 | 8/2014 | Tomizawa et al. |
| 2002/0060105 | A1 | 5/2002 | Tominaga et al. |
| 2003/0127921 | A1* | 7/2003 | Akutsu et al. ............... 310/68 R |
| 2003/0173920 | A1 | 9/2003 | Tominaga et al. |
| 2005/0082925 | A1 | 4/2005 | Yamamoto et al. |
| 2006/0267431 | A1 | 11/2006 | Johnson et al. |
| 2008/0150377 | A1 | 6/2008 | Yamaguchi et al. |
| 2009/0133955 | A1 | 5/2009 | Morikawa et al. |
| 2009/0267430 | A1 | 10/2009 | Imamura et al. |
| 2011/0285226 | A1* | 11/2011 | Fujita et al. ...................... 310/71 |

(Continued)

FOREIGN PATENT DOCUMENTS

| | | |
|---|---|---|
| JP | 2000-023408 | 1/2000 |
| JP | 2000-217310 | 8/2000 |

(Continued)

OTHER PUBLICATIONS

Office Action (5 pages) dated Jan. 5, 2015, issued in corresponding Japanese Application No. 2011-229651 and English translation (5 pages).

(Continued)

*Primary Examiner* — Alex W Mok
(74) *Attorney, Agent, or Firm* — Nixon & Vanderhye P.C.

(57) ABSTRACT

It is an object to provide a driving apparatus, which can be easily mounted to vehicles of different models. A circuit unit for controlling an operation of an electric motor is fixed to an axial end of a motor casing. A connector holding unit, which is integrally formed with a heat sink of the circuit unit, is composed of a first and a second arm portions and a connecting portion to form a connector accommodating space in such a radial outside position of the motor casing. The connector accommodating space extends in an axial direction of the motor casing. An inside connector unit is inserted into the connector accommodating space. The inside connector unit has a connector-insert hole into which an outside connector (a vehicle-side connector) is inserted for electrical connection.

3 Claims, 18 Drawing Sheets

(56) References Cited

U.S. PATENT DOCUMENTS

2011/0291502 A1* 12/2011 Tang et al. .................. 310/71
2012/0098365 A1* 4/2012 Yamasaki et al. ............ 310/71
2012/0229005 A1 9/2012 Tominaga et al.

FOREIGN PATENT DOCUMENTS

| JP | 2004147490 A * | 5/2004 |
| JP | 2009-060746 | 3/2009 |
| JP | 2011-37324 | 2/2011 |
| JP | 2011200022 A * | 10/2011 |
| WO | WO 2011114554 A1 * | 9/2011 |

OTHER PUBLICATIONS

Office Action (7 pages) dated Aug. 13, 2014, issued in corresponding Chinese Application No. 201210337204.5 and English translation (10 pages).

U.S. Appl. No. 13/611,071, filed Sep. 12, 2012, Suga et al.

Office Action (2 pages) dated Sep. 30, 2014, issued in corresponding Japanese Application No. 2011-229639 and English translation (3 pages).

Office Action (8 pages) dated Sep. 9, 2014, issued in corresponding U.S. Appl. No. 13/611,071, filed Sep. 12, 2012, Suga et al.

* cited by examiner

DRIVING APPARATUS

CROSS REFERENCE TO RELATED APPLICATION

This application is based on Japanese Patent Application No. 2011-229639 filed on Oct. 19, 2011, the disclosure of which is incorporated herein by reference.

TECHNICAL FIELD

The present disclosure relates to a driving apparatus, in which an electric motor and a control unit for controlling an operation of the electric motor are integrally assembled together.

BACKGROUND

A driving apparatus for an electric power steering system (hereinafter EPS) is known in the art, according to which a steering operation of a vehicle driver is assisted by a driving force of an electric motor. Such a driving apparatus for the EPS is known in the art, according to which a mechanical unit (an electric motor) and an electrical unit (a control unit for controlling an operation of the electric motor) are integrally formed as one assembly unit.

According to a conventional driving apparatus, for example, as disclosed in Japanese Patent Publication No. 2011-37324 (A), a connector-insert hole of an inside connector unit is formed in a control unit at an axial end thereof, wherein the connector-insert hole is opened in an axial direction of an electric motor. When the driving apparatus is mounted in a vehicle, a corresponding connector(s) of a vehicle side is attached to (connected to) the inside connector unit of the control unit. Electric power from a battery mounted in the vehicle is supplied to an electronic circuit of the control unit via a power-supply wire provided in the vehicle, the vehicle-side connector and the inside connector unit (connected to the vehicle-side connector).

However, a position of the vehicle-side connector differs from a vehicle to a vehicle, in which the driving apparatus is mounted. According to the driving apparatus of the above patent publication, in a case that the vehicle-side connector is provided at a side of the control unit opposite to the connector-insert holes of the inside connector unit, it is necessary to pull the vehicle wire to a position of the connector-insert holes of the inside connector unit of the control unit. Therefore, a number of assembling steps for mounting the driving apparatus to the vehicle is increased.

In addition, according to the control unit of the driving apparatus of the above patent publication, the electronic circuit is formed on a circuit board at a side thereof opposite to the connector-insert holes of the inside connector unit. In a case that the connector-insert holes of the inside connector unit will be formed in the control unit at another axial end in the motor axial direction, in order to correspond to the position of the vehicle-side connector, a layout of an entire control unit must be changed depending on a re-design of the connector-insert holes of the inside connector unit. When multiple kinds of the control units, the layouts of which are different from one another depending on vehicle models, are prepared, manufacturing cost for the driving apparatus will be inevitably increased.

SUMMARY OF THE DISCLOSURE

The present disclosure is made in view of the above points. It is an object of the present disclosure to provide a driving apparatus, which can be easily mounted to a vehicle.

According to a feature of the present disclosure, for example, as defined in claim 1, a driving apparatus has a motor unit, a circuit unit, a connector holding unit and an inside connector unit.

The motor unit is composed of; a cylindrical motor casing for forming an outer frame; a stator provided in a radial inside of the motor casing and having multiple-phase windings wound on the stator; and a rotor rotatably accommodated in a radial inside of the stator.

The circuit unit is attached to an axial end of the motor casing and composed of; driving elements for supplying electric power to the windings of the stator; a heat sink for absorbing heat generated at the driving elements; and circuit boards having electronic circuits electrically connected to the driving elements.

The connector holding unit is composed of; a first and a second arm portions extending from the circuit unit in a radial outward direction thereof; a connecting portion for connecting the first and second arm portions with each other; and a connector accommodating space, which is formed in the first and second arm portions and the connecting portion and which extends in an axial direction of the motor casing.

The inside connector unit is fixed to the connector holding unit and composed of; a connector-insert hole, which is opened in the axial or radial direction of the motor casing and to which an outside connector is connected in order that electric power is supplied from an outside power source or control signals are supplied from an outside electronic apparatus to the electronic circuits. The inside connector unit is inserted into the connector holding space at such a position, which is located at an outside of the motor casing in the radial direction thereof.

According to the above feature, the connector holding unit has the connector accommodating space with axial open ends in the axial direction of the motor casing. It is, therefore, possible to fix the inside connector unit (having various kinds of shapes) to the connector holding unit, wherein the inside connector unit has the connector-insert openings depending on a direction of an opening of the outside connector (that is, the vehicle-side connector) of the vehicle to which the driving apparatus is mounted. The inside connector unit having the various kinds of shape includes; an inside connector unit having a connector-insert opening opened in the axial direction of the motor casing away from the electric motor; an inside connector unit having a connector-insert opening opened in the axial direction of the motor casing toward the electric motor; and an inside connector unit having a connector-insert opening opened in the radial outward direction of the motor casing.

As a result, it is not necessary to pull the wire for the outside connector (the vehicle-side connector). It is, therefore, possible to easily connect the outside connector to the inside connector unit of the driving apparatus. In other words, it is possible to easily mount the driving apparatus to the vehicle.

In addition, the motor unit (the electric motor), the circuit unit and the connector holding unit are commonalized, on one hand. On the other hand, the inside connector unit can be easily changed depending on the direction of the opening of the outside connector (the vehicle-side connector). As above, it is possible to reduce a cost for manufacturing the driving apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
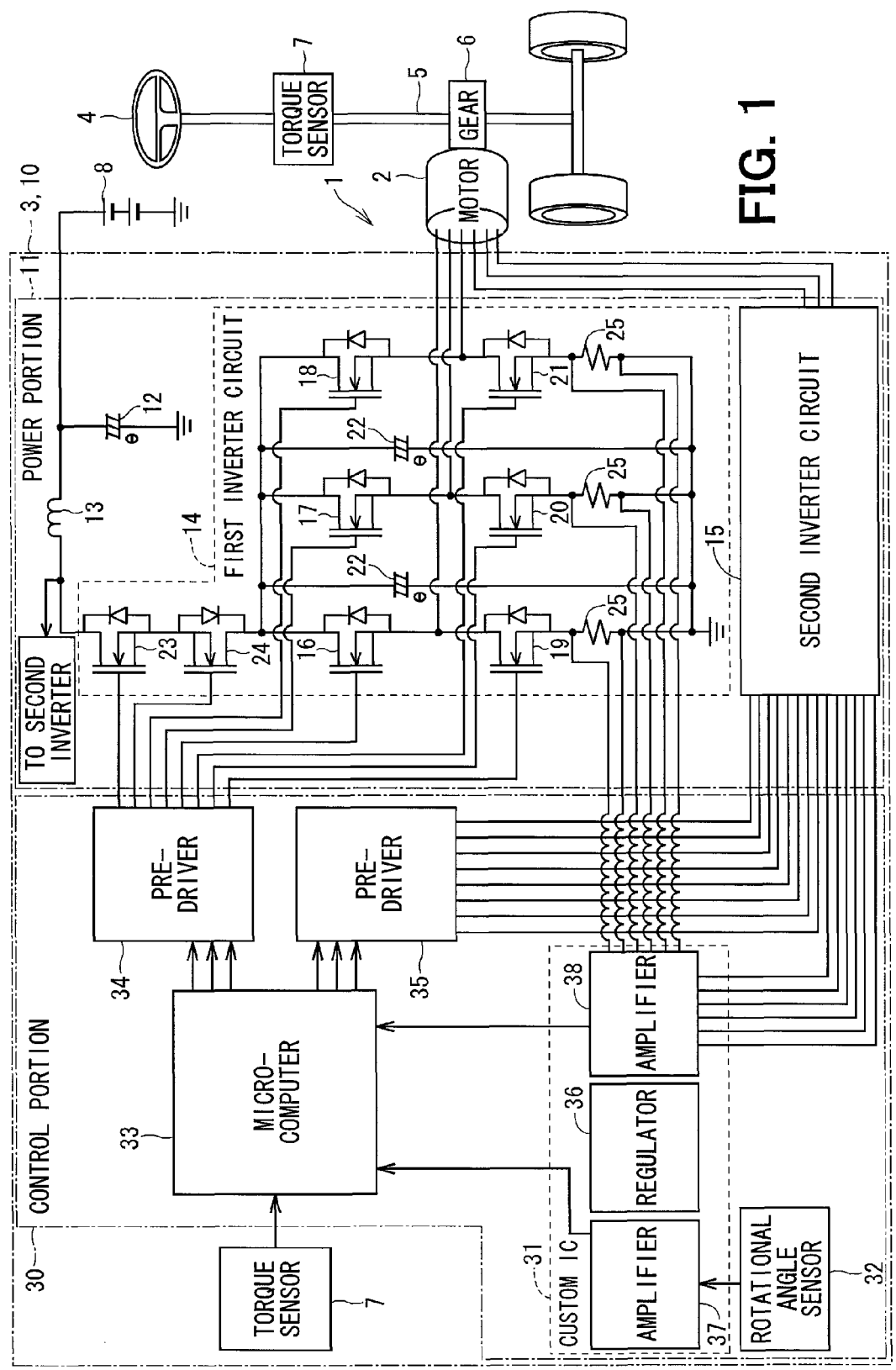
FIG. 1 is a schematic diagram showing a structure of a power steering apparatus for a vehicle according to a first embodiment of the present disclosure.

The present disclosure will be explained by way of multiple embodiments with reference to the drawings. The same reference numerals are used throughout the embodiments for the purpose of designating the same or similar parts and components.

First Embodiment

A driving apparatus 1 of a first embodiment of the present disclosure will be explained with reference to FIGS. 1 to 10. The driving apparatus 1 is applied to an electrical power steering device (EPS) for a vehicle.

As shown in FIG. 1, the driving apparatus 1 is composed of a motor unit (including an electric motor 2) and a control unit 3. An output portion 100 of the electric motor 2 is engaged with a speed-reduction gear 6, which rotates a steering shaft 5 connected to a steering wheel 4 of the vehicle.

When the steering wheel 4 is operated by a vehicle driver, a steering torque generated in the steering shaft 5 is detected by a torque sensor 7. The driving apparatus 1 generates a rotational torque for assisting a steering operation of the steering wheel 4 by the vehicle driver based on a signal outputted from the torque sensor 7 as well as other information (including a vehicle speed) transmitted via a CAN (Control Area Network: not shown). The rotational torque is transmitted to the steering shaft 5 via the speed-reduction gear 6.

Figure 6:
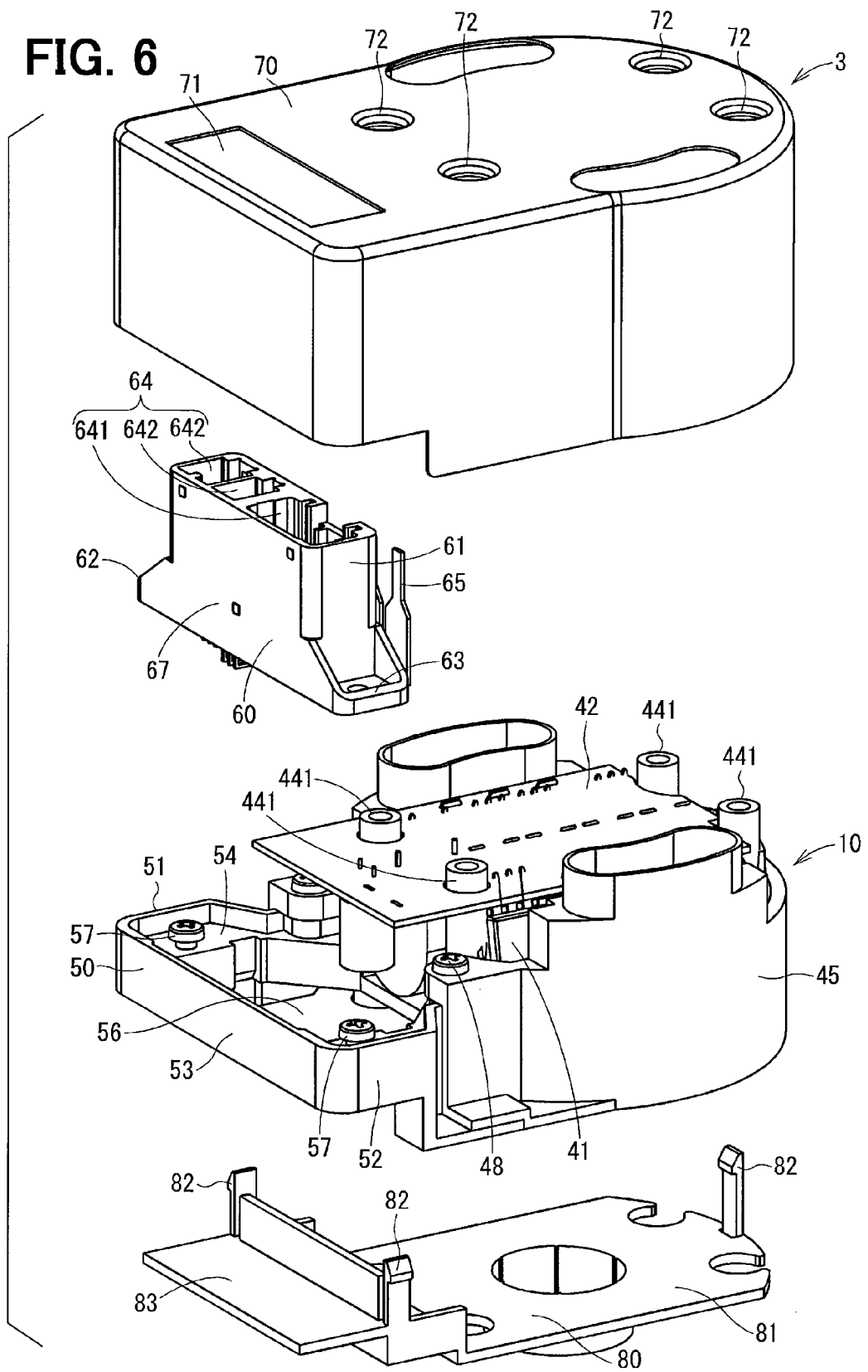
FIG. 6 is an exploded perspective view schematically showing a control unit of the driving apparatus according to the first embodiment.
Figure 7:
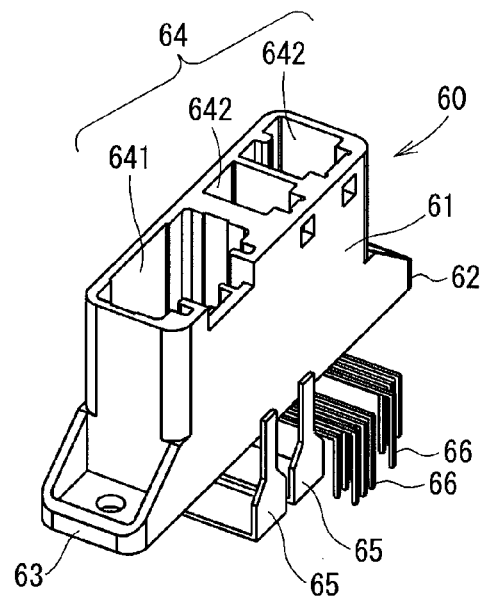
FIG. 7 is a schematic perspective view showing a relevant portion of an inside connector unit.

As shown in FIG. 6, the control unit 3 is composed of a circuit unit 10, a connector holding unit 50, an inside connector unit 60, an upper-side cover member 70, a lower-side cover member 80 and so on.

At first, an electrical structure of the circuit unit 10 of the control unit 3 will be explained with reference to FIG. 1. The circuit unit 10 is composed of a driving power portion 11, through which driving current for the electric motor 2 flows, and a control portion 30 for controlling an operation of the driving power portion 11. The control unit 3 controls a driving operation of the electric motor 2.

The driving power portion 11 is composed of a first capacitor 12, a choke coil 13, multiple switching elements 16 to 21 for forming multiple (first and second) inverter circuits 14 and 15, second capacitors 22 and so on. The switching elements 16 to 21 are also referred to as "driving elements".

Electric power is supplied to the driving power portion 11 from a battery (an outside power source) 8, which is provided at an outside of the driving apparatus 1. The first capacitor 12 and the choke coil 13 provided in the driving power portion 11 form a filter circuit for reducing noises, which may be transmitted to the driving power portion 11 from other electronic devices commonly having the battery 8 and/or which may be transmitted from the driving power portion 11 to the other electronic devices. The choke coil 13 is connected in series between the battery 8 and power-source relays 23 and 24 so as to attenuate fluctuation in voltage.

The driving power portion 11 has a pair of (first and second) inverter circuits 14 and 15. Since structures of the inverter circuits 14 and 15 are identical to each other, explanation will be made only for the first inverter circuit 14.

Each of the power-source relays 23 and 24 as well as the switching elements 16 to 21 is formed of a MOSFET (a metal-oxide-semiconductor field-effect transistor, hereinafter referred to as a MOS transistor). In the MOS transistor, a source-drain path is turned on or turned off depending on a gate potential. The power-source relays 23 and 24 are provided between the switching elements 16 to 21 and the choke coil 13 in order to cut off electric current to the electric motor 2 via the switching elements 16 to 21 in a case of an abnormal condition.

Each drain of three switching elements 16 to 18 on a power-source side is connected to a power-supply line, while each source thereof is respectively connected to each drain of other three switching elements 19 to 21 on a ground side. Each source of the other three switching elements 19 to 21 on the ground side is connected to the ground via each shunt resistor 25. Each connecting point between the three switching elements 16 to 18 on the power-source side and the other three switching elements 19 to 21 on the ground side is respectively connected to each three-phase winding 95 of the electric motor 2.

The shunt resistor 25 is connected between each switching element 19 to 21 and the ground. Electric potential between both ends of each shunt resistor 25 or electric current flowing through each of the shunt resistors 25 is detected so as to detect the driving current supplied to the electric motor 2.

Each of the second capacitors 22 is connected between the power-supply line for the switching elements 16 to 18 and a ground line for the switching elements 19 to 21. In other words, the second capacitors 22 are connected in parallel to the switching elements 16 to 21. The capacitors 22 store electric charge so as to assist power supply to the switching elements 16 to 21 and/or absorb ripple current which may be generated when the driving current to the electric motor is switched over.

The control portion 30 is composed of a custom IC 31, a rotational angle sensor 32, a micro-computer 33, pre-driver circuits 34 and 35 and so on.

The custom IC 31 is a semiconductor integrated circuit, including a regulator 36, an amplifying portion 37 for a rotational-angle sensor signal, an amplifying portion 38 for detected voltage and so on.

The regulator 36 is a stabilization circuit for stabilizing the power supply from the battery 8 to the respective portions. For example, the micro-computer 33 operates with a stabilized predetermined voltage (for example, 5 volt) from the regulator 36.

The sensor signal from the rotational angle sensor 32 is inputted to the amplifying portion 37. The rotational angle sensor 32 is provided in a magnetic field of a magnet, which is attached to a shaft 93 of the electric motor 2, so as to detect a change of the magnetic field surrounding the sensor. The sensor signal of the rotational angle sensor 32 is supplied to the amplifying portion 37 as a signal representing a rotational position of a rotor 92 of the electric motor 2. The sensor signal for the rotational angle is amplified by the amplifying portion 37 and then supplied to the micro-computer 33.

The amplifying portion 38 detects the voltage across the shunt resisters 25 and amplifies the detected voltage to output it to the micro-computer 33.

The micro-computer 33 has a CPU as a calculating portion and a ROM, a RAM or the like as a memory device. Input signals, such as the sensor signal for the rotational position of the rotor 92, the voltage across the shunt resisters 25, a sensor signal for the steering torque, the information of the vehicle speed and so on are inputted into the micro-computer 33 respectively from the amplifying portion 37 for the rotational angle sensor 32, the amplifying portion 38 for the detected voltage, the torque sensor 7 and CAN (from an outside electronic apparatus via CAN).

The micro-computer 33 produces a pulse signal, which is formed by a PWM control, from the pre-driver circuits 34 and 35 based on the rotational angle of the rotor 92 of the electric motor 2, when the above input signals are inputted. The driving apparatus 1 assists the operation of the steering wheel 4 depending on the vehicle speed. The pulse signal controls switching operations (on-off operations) of the switching elements 16 to 21 of the two systems of the inverter circuits 14 and 15.

In addition, the micro-computer 33 controls the inverter circuits 14 and 15 based on the voltage across the shunt resistors 25 from the amplifying portion 38 for detected-voltage, so as to generate electric current of a substantially sinusoidal waveform, which is supplied to the electric motor 2. As a result, different phase driving currents of the sinusoidal waveform are supplied to the electric motor 2, so that a rotating magnetic field is generated in the windings 95 of a stator 91 of the electric motor 2. The electric motor 2 generates a torque by the rotating magnetic field, so that the operation of the steering wheel 4 by the vehicle driver is assisted.

Figure 2:
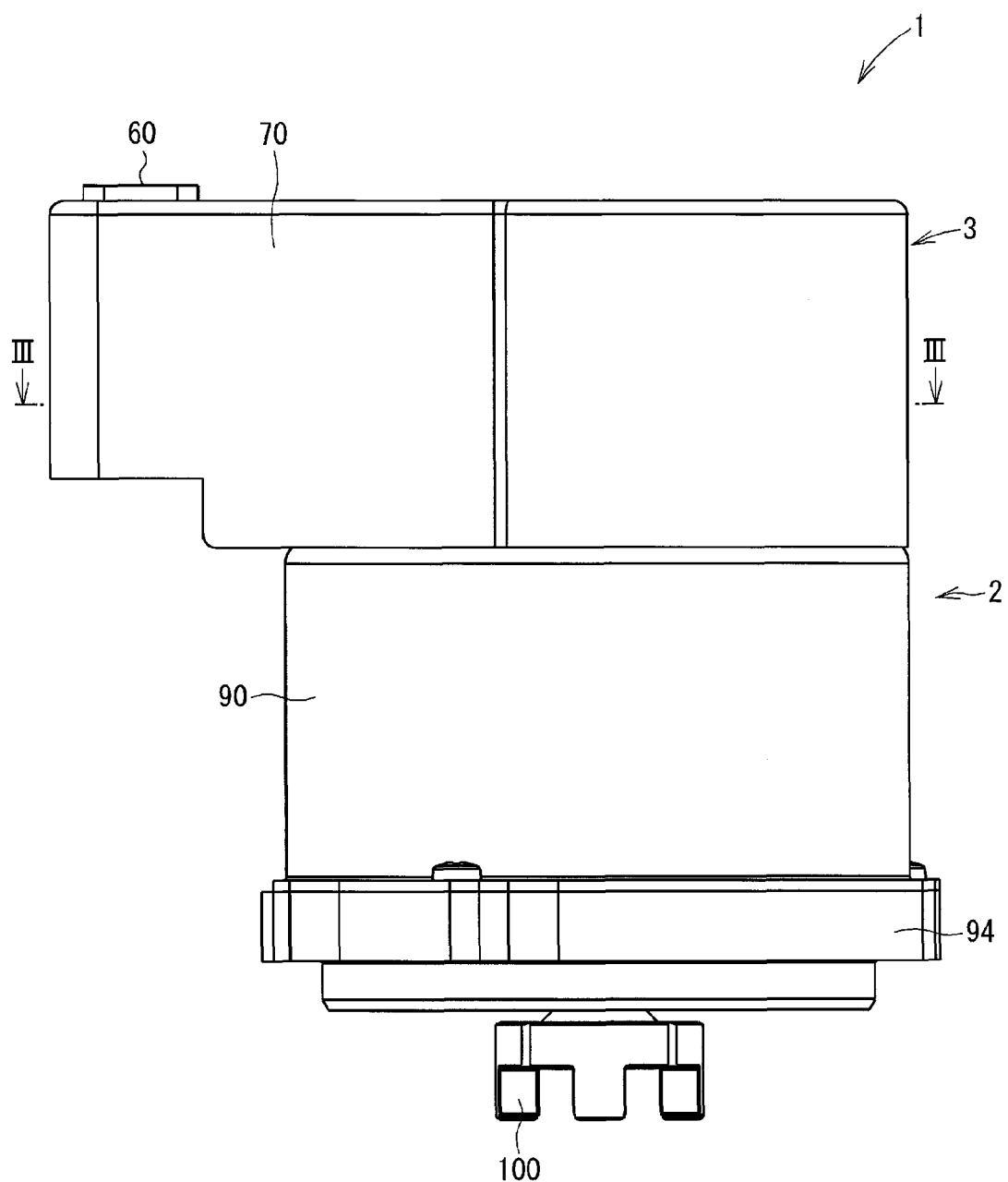
FIG. 2 is a schematic side view showing a driving apparatus of the first embodiment.

A structure of the control unit 3 will be then explained. As shown in FIG. 2, the control unit 3 is provided at one axial end of the electric motor 2.

Figure 3:
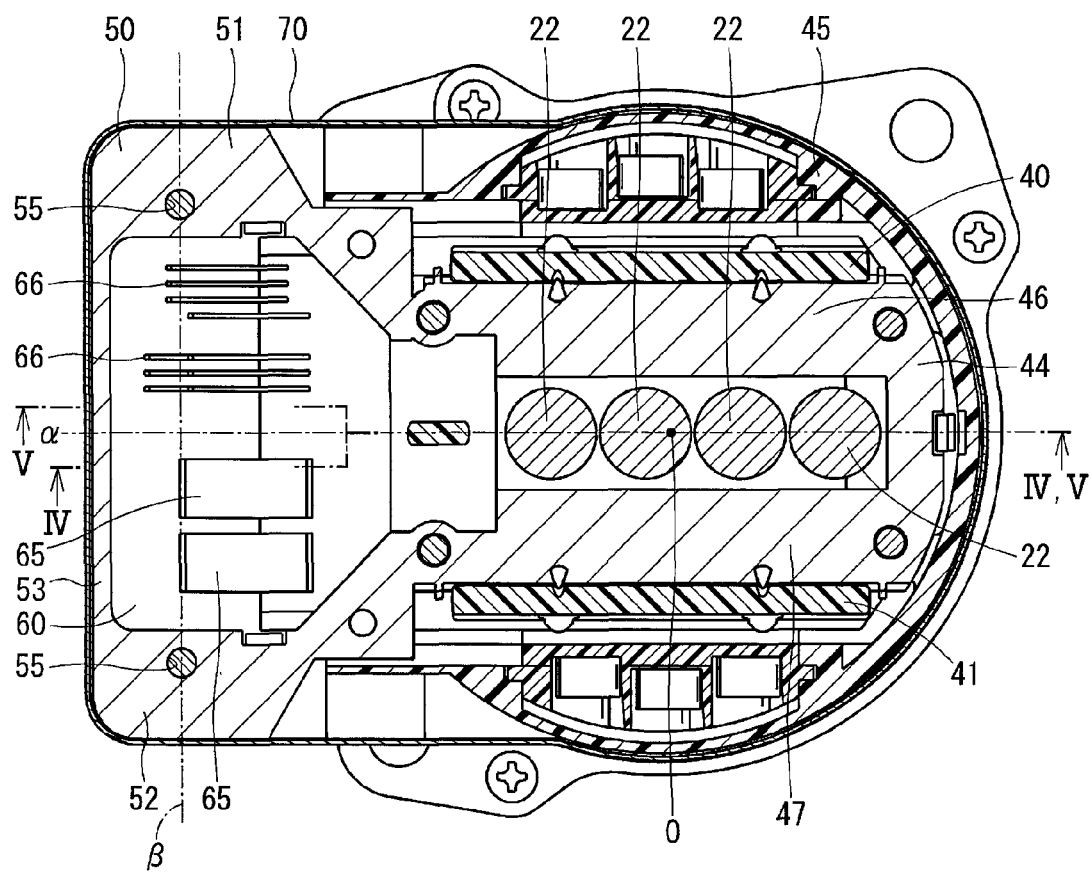
FIG. 3 is a cross sectional view taken along a line in FIG. 2.
Figure 4:
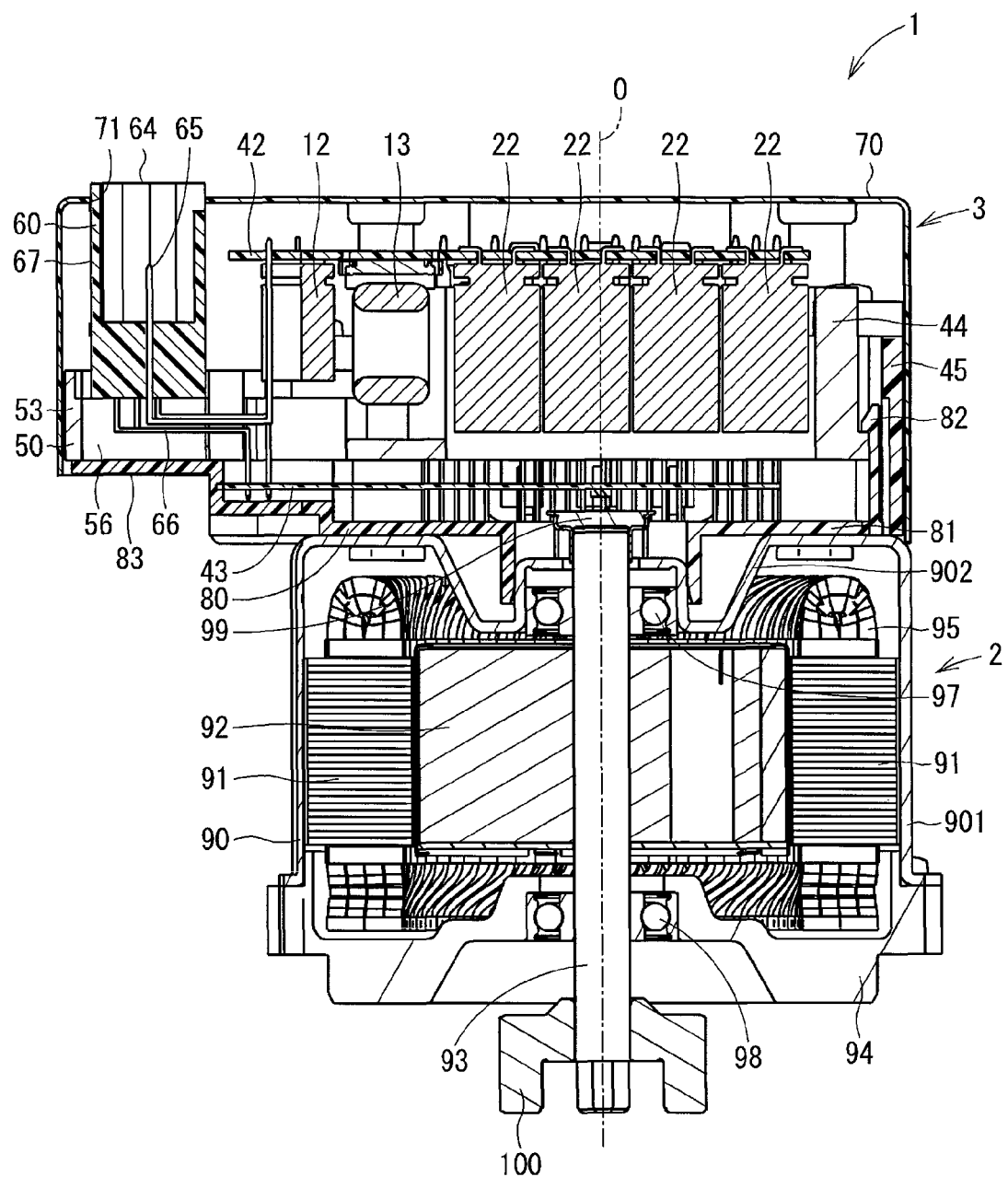
FIG. 4 is a cross sectional view taken along a line IV-IV in FIG. 3.
Figure 5:
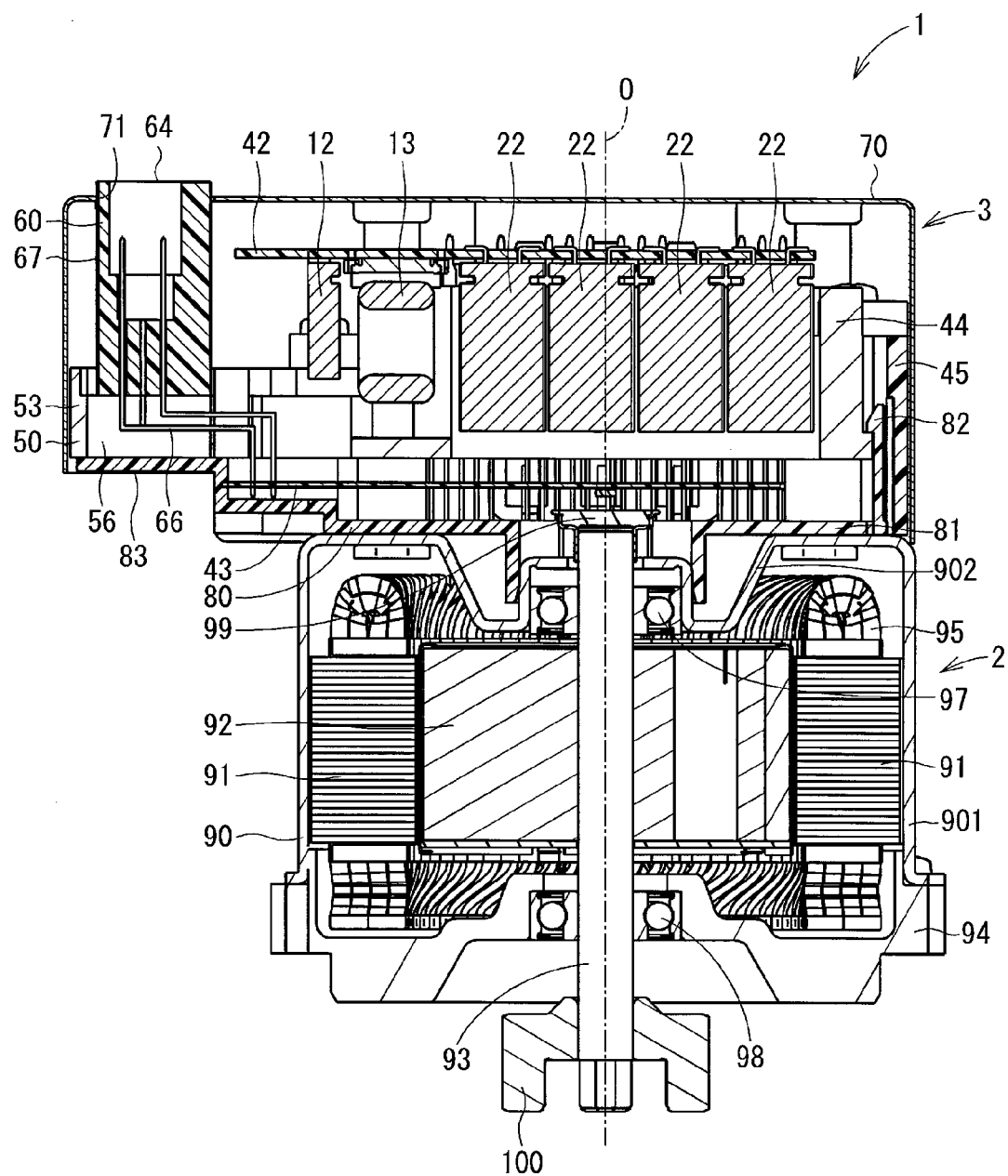
FIG. 5 is a cross sectional view taken along a line V-V in FIG. 3.

As shown in FIGS. 3 to 5, the circuit unit 10 of the control unit 3 is composed of a pair of power modules 40 and 41, a power circuit board 42, a control circuit board 43, a heat sink 44, a component carrier 45 and so on.

One of the power modules (the power module 40) is formed of a sealed body, in which the parts and components for the first inverter circuit 14 (including the power-source relays 23 and 24, the switching elements 16 to 21, the shunt resisters 25, wiring patterns electrically connecting them, and so on) are covered with and sealed by sealing material, such as resin. In a similar manner, the other power module 41 is formed of a sealed body, in which switching elements and other electrical parts and components for the second inverter circuit 15 are covered with and sealed by sealing material (for example, resin). The power modules 40 and 41 are formed in the substantially identical structure to each other.

The above first capacitor 12, the choke coil 13, the second capacitors 22 and other parts, which form the driving power portion 11, are mounted to the power circuit board 42. In addition, wiring patterns, through which the electric current flows from the battery 8 to the three-phase windings 95 of the electric motor 2 via the switching elements 16 to 21 of the power modules 40 and 41, are formed on the power circuit board 42. As above, the power circuit board 42 forms an electronic circuit, through which large driving current flows from the battery 8 to the electric motor 2.

On the other hand, the custom IC 31, the rotational angle sensor 32, the micro-computer 33, the pre-driver circuits 34 and 35 and so on, which form the control portion 30, are mounted to the control circuit board 43. In addition, wiring patterns, through which signals for controlling switching operations (the on-off operations) of the switching elements 16 to 21 of the power modules 40 and 41 are transmitted, are formed on the control circuit board 43. As above, the control circuit board 43 forms an electronic circuit, which controls the switching operations of the switching elements 16 to 21.

The power circuit board 42 and the control circuit board 43 are collectively referred to as "the circuit boards".

The heat sink 44 is made of material having high heat conductivity, such as aluminum, for absorbing heat generated at the power modules 40 and 41. The heat sink 44 is composed of a pair of blocks 46 and 47, which are arranged to oppose to each other across a virtual plane "α" including a center axis "O" of a motor casing 90. The power module 40 is fixed to an outer wall of one of the blocks (the block 46), while the other power module 41 is fixed to an outer wall of the other block 47.

The power circuit board 42 is located at one axial end of the heat sink 44, which is on a side opposite to the electric motor 2 (that is, a side away from the electric motor 2), while the control circuit board 43 is located at the other axial end of the heat sink 44, which is on a side closer to the electric motor 2. The second capacitors 22 are arranged between the blocks 46 and 47.

As shown in FIGS. 3 to 6, 8 and 9, the connector holding unit 50 is integrally formed with the heat sink 44 and has a pair of arm portions 51 and 52 (a first and a second arm portions 51 and 52) and a connecting portion 53.

One of the arm portions (the first arm portion 51) extends from the block 46 of the heat sink 44 in a radial outward direction and in a direction away from the virtual plane "α". A forward end portion of the first arm portion 51 further extends from an intermediate portion of the first arm portion 51 in a direction parallel to the virtual plane "α". In a similar manner, the other arm portion 52 (the second arm portion 52) extends from the other block 47 of the heat sink 44 in the radial outward direction and in the direction away from the virtual plane "α". A forward end portion of the other (the second) arm portion 52 further extends from an intermediate portion of the second arm portion 52 in a direction parallel to the virtual plane "α". Each of the first and second arm portions 51 and 52 has a contacting surface 54, which is brought into contact with a contacting portion of the inside connector unit 60. The contacting surfaces 54 are formed on a plane perpendicular to the center axis "O" of the motor casing 90. A screw hole 55 is formed in the respective arm portions 51 and 52 in an area of the contacting surface 54.

The connecting portion 53 is formed in a flat plate shape between the arm portions 51 and 52 so as to connect them with each other. The connecting portion 53 of the flat plate shape is formed on a plane, which is perpendicular to the virtual plane "α" but in parallel to a virtual plane "β" (which is in parallel to the center axis "O" of the motor casing 90). Furthermore, the connecting portion 53 is formed on the plane, which is perpendicular to the contacting surface 54 of each arm portion 51, 52.

The connector holding unit 50 has a connector accommodating space 56 at an inside of the arm portions 51 and 52 and the connecting portion 53. The connector accommodating space 56 extends in an axial direction of the motor casing 90. The connector accommodating space 56 is formed in an area, which is radially outside of the motor casing 90, when viewed in the axial direction of the motor casing 90. Both axial ends of the connector accommodating space 56 are opened in the axial direction of the motor casing 90.

As shown in FIGS. 3 to 7, the inside connector unit 60 is composed of a main connector body 61, a pair of (first and second) flanged portions 62 and 63 and multiple connector terminals 65 and 66.

The main connector body 61 is formed in a rectangular body, sides and vertexes of which are angular or rounded. The main connector body 61 is arranged in such a way that side surfaces 67 of the rectangular body (the connector body 61), an area of which is largest among side surfaces, are parallel to the center axis "O" of the motor casing 90. The main connector body 61 has three openings 64 (connector-insert holes 641, 642), into which outside connectors (the vehicle-side connectors) are respectively inserted. The three openings 64 are formed in the main connector body 61 on a side opposite to the electric motor 2 in the axial direction thereof. In other words, the connector-insert holes 641 and 642 are opened in the axial direction of the motor casing 90.

One of the outside connectors is inserted into one of the openings 64 (the connector-insert hole 641), in order that the electric power is supplied from the battery 8 to the electronic circuit of the power circuit board 42. The other outside connectors are inserted into the other openings 64 (the connector-insert holes 642), so that signals transmitted from, for example, the torque sensor 7 and so on, are supplied to the electronic circuit of the control circuit board 43.

The connector terminals are composed of power terminals 65 and control terminals 66. Each of the power terminals 65 is formed in a U-letter shape (as shown in FIG. 4), one end of which is molded in the main connector body 61 and adapted to be connected to a terminal of the outside connector (the vehicle-side connector: not shown) and the other end of which is connected to the wiring pattern of the power circuit board 42. Each of the control terminals 66 is formed in a Z-letter shape (as shown in FIG. 5), one end of which is molded in the main connector body 61 and adapted to be connected to a terminal of the other outside connector (not shown) and the other end of which is connected to the wiring patterns of the control circuit board 43.

The pair of the flanged portions 62 and 63 are made of resin and integrally formed with the main connector body 61. Each of the flanged portions 62 and 63 extends from the respective side surface of the main connector body 61 in the lateral direction. One of the flanged portions (the first flanged portion 62) is fixed to the first arm portion 51 of the connector holding unit 50, while the other (the second) flanged portion 63 is fixed to the second arm portion 52 of the connector holding unit 50.

The first flanged portion 62, the one ends of the respective control terminals 66, the one ends of the respective power terminals 65 and the second flanged portion 63 are arranged in a line on the virtual plane "β", which is parallel to the center axis "O" of the motor casing 90.

When the outside connectors (the vehicle-side connectors) are inserted into the openings 64 (the respective connector-insert holes 641 and 642) of the inside connector unit 60, the connecting portion 53 of the connector holding unit 50 suppresses an occurrence of such a situation that the inside connector unit 60 is inclined in the radial outward direction of the motor casing 90. In addition, pressing force transmitted from the outside connectors to the inside connector unit 60 is received at the contacting surfaces 54 of the first and second arm portions 51 and 52.

Figure 8:
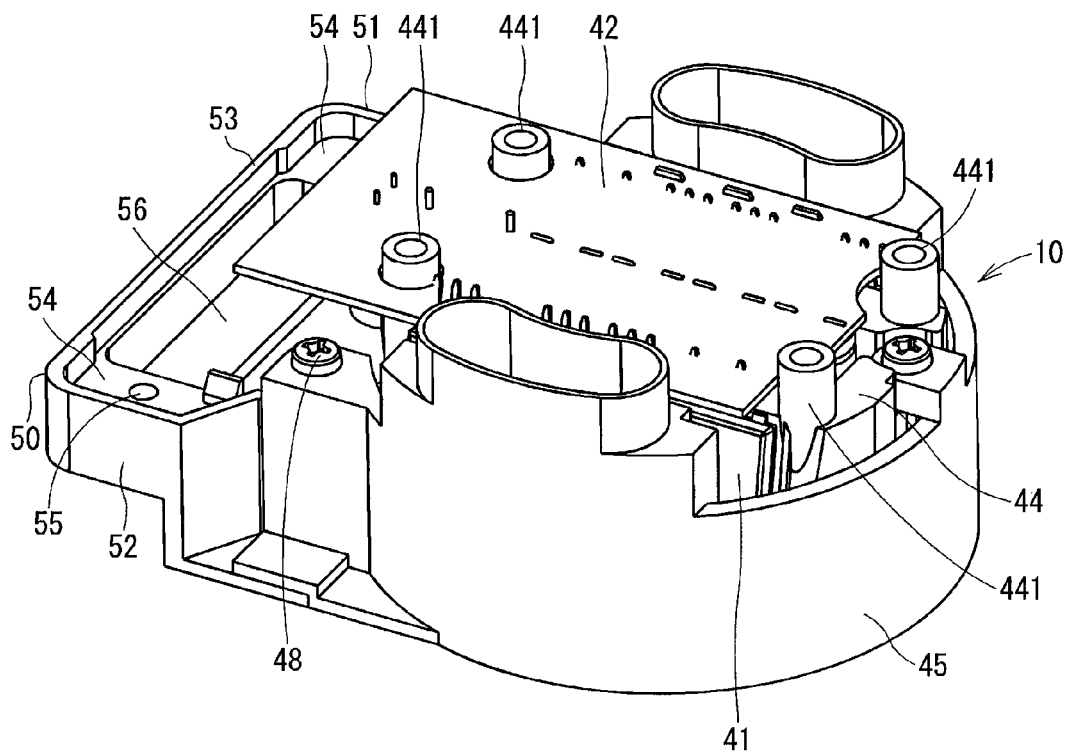
FIG. 8 is a schematic perspective view showing a circuit unit of the driving apparatus.
Figure 9:
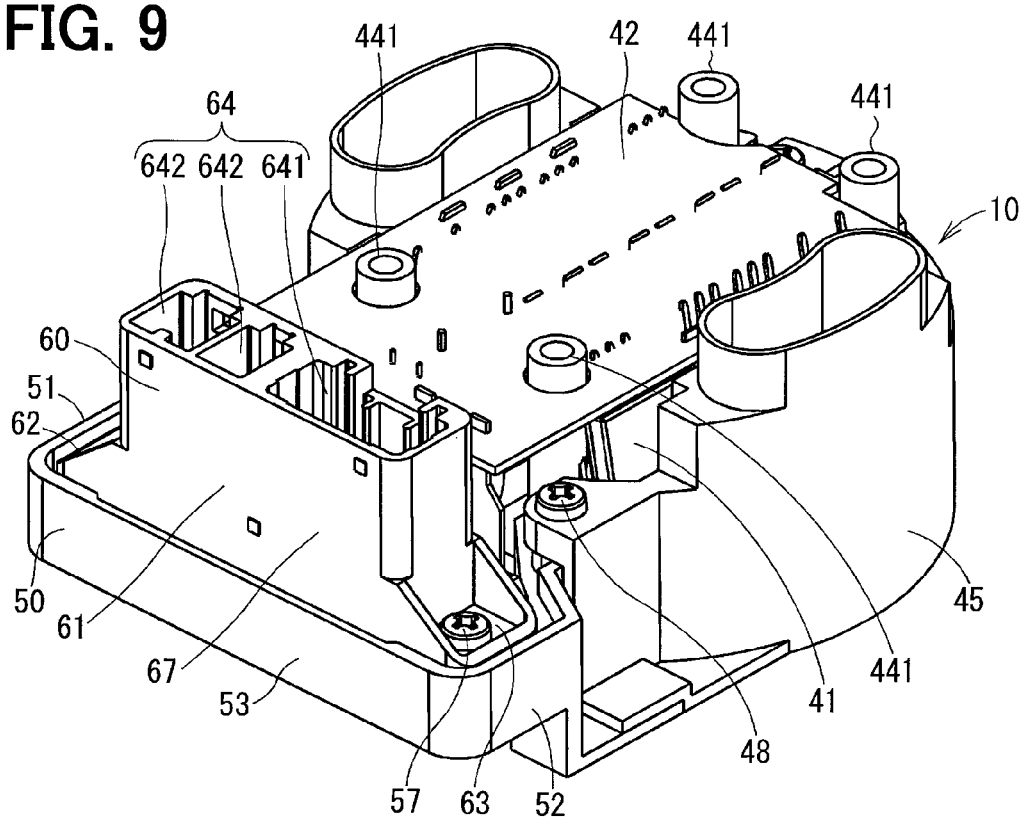
FIG. 9 is a schematic perspective view showing the circuit unit and the inside connector unit of the driving apparatus, wherein the inside connector unit is assembled to the circuit unit.

As shown in FIGS. 6, 8 and 9, the component carrier 45 is made of resin and arranged at an outside of the heat sink 44. The component carrier 45 is fixed to the heat sink 44 by screws 48.

Multiple circuit-board terminals (not shown) and multiple motor terminals (not shown) are connected to each other in an inside of the component carrier 45. The circuit-board terminals correspond to such terminals, which are electrically connected to wires extending from the power modules 40 and 41 toward the power circuit board 42. The motor terminals correspond to such terminals, which are electrically connected to the windings 95 wound on the stator 91 of the electric motor 2. According to such a structure, the electric current flows from the circuit unit 10 to the windings 95 of the electric motor 2.

As shown in FIGS. 3 to 6 and 10, the upper-side cover member 70 is formed in a cylindrical shape having a closed end so as to cover the circuit unit 10, the connector holding unit 50 and the inside connector unit 60, from one axial end of the control unit 3, that is, on a side of the control unit 3 opposite to the electric motor 2. The upper-side cover member 70 has a through-hole 71, through which the main connector body 61 of the inside connector unit 60 passes outwardly, so that the outside connector (not shown) can be inserted into the openings 64 (the connector-insert holes 641 and 642) of the inside connector unit 60. The upper-side cover member 70 is fixed to the motor casing 90 together with the heat sink 44 by means of through-bolts (not shown) inserted through multiple through-holes 72 formed in the upper-side cover member 70.

As shown in FIGS. 4 to 6, the lower-side cover member 80 covers the circuit unit 10, the connector holding unit 50 and the inside connector unit 60, from the other axial end of the control unit 3, that is, on aside of the control unit 3 closer to the electric motor 2. The lower-side cover member 80 is attached to the heat sink 44 by means of multiple claw portions 82, each of which extends from a cover body 81 in a direction perpendicular to the cover body 81. The lower-side cover member 80 has a protecting plate portion 83, which is brought into contact with lower ends of the arm portions 51 and 52 as well as the connecting portion 53 (that is, axial ends in the axial direction of the motor casing 90 on a side to the electric motor 2). The open end of the connector accommodating space 56 (that is the lower end in the drawings) is closed by the protecting plate portion 83 for protecting the connector terminals 65 and 66.

A structure of the motor unit (the electric motor 2) will be explained with reference to FIGS. 4 and 5.

The electric motor 2 is composed of the motor casing 90, the stator 91, the rotor 92, the shaft 93 and so on.

The motor casing 90 is made of an iron plate by press work and is formed in a cylindrical shape having a closed end. The motor casing 90 forms an outer frame of the electric motor 2. The motor casing 90 is composed of a cylindrical wall 901 and a bottom wall 902 extending from an axial end of the cylindrical wall 901 in a radial inward direction thereof. An end frame 94 is attached to the motor casing 90 at an axial open end of the cylindrical wall 901 to close it.

The stator 91 is fixed to an inner wall surface of the cylindrical wall 901. The stator 91 is composed of multiple laminated steel plates and has multiple projected pole portions and multiple slots (not shown), which are alternately arranged in a circumferential direction of the stator 91. The multiple windings 95 are accommodated in the slots of the stator 91. Each of the windings 95 is wound on the respective projected pole portions. The windings 95 form two systems of three-phase windings. Each coil end (not shown) of the windings 95 outwardly extends from the bottom wall 902 toward the control unit 3 and is connected to the respective motor terminals (not shown).

The rotor 92 is made of multiple laminated steel plates and arranged in an inside of the stator 91 so that the rotor 92 is rotated in the inside of the stator 91. Multiple magnetic poles (north and south poles) are alternately formed at an outer periphery in its circumferential direction of the rotor 92. The shaft 93 is firmly fixed to a center hole formed in the rotor 92. One end (an upper end in FIGS. 4 and 5) of the shaft 93 is rotatably supported by a bearing 97 provided at the bottom wall 902 of the motor casing 90 and the other end of the shaft 93 is rotatably supported by a bearing 98 provided in the end frame 94, so that the rotor 92 is rotatably accommodated in the motor casing 90. A magnet 99 is provided at the upper end of the shaft 93 (on the side facing to the control circuit board 43), so that the rotational position of the shaft 93 (the rotational position of the rotor 92) can be detected.

When the electric power is supplied from the circuit unit 10 to the windings 95 of the stator 91, the rotating magnetic field is formed so that the shaft 93 and the rotor 92 are rotated in a forward or a backward direction with respect to the stator 91 and the motor casing 90. The driving force is then outputted from the output portion 100 (the lower end of the shaft 93) to the speed-reduction gear 6 of the column shaft 5.

Now, a method for manufacturing the driving apparatus 1 will be explained with reference to FIGS. 6 to 10.

The inside connector unit 60 is inserted into the connector accommodating space 56, which is formed in the connector holding unit 50 of the heat sink 44. The flanged portions 62 and 63 of the inside connector unit 60 are fixed by screws 57 to the respective arm portions 51 and 52 of the connector holding unit 50.

The component carrier 45 is then fixed to the heat sink 44 by the screws 48.

The power circuit board 42 and the control circuit board 43, to which the electronic parts are respectively mounted, are fixed to the heat sink 44 by screws (not shown). The power terminals 65 of the inside connector unit 60 as well as the circuit-board terminals (not shown) of the component carrier 45 are electrically connected to the power circuit board 42 by soldering or the like. In a similar manner, the control terminals 66 of the inside connector unit 60 are electrically connected to the control circuit board 43.

The circuit unit 10 and the connector holding unit 50 are common parts, which are also used in a driving apparatus of a second embodiment and a third embodiment of the present disclosure, which will be explained below.

Figure 10:
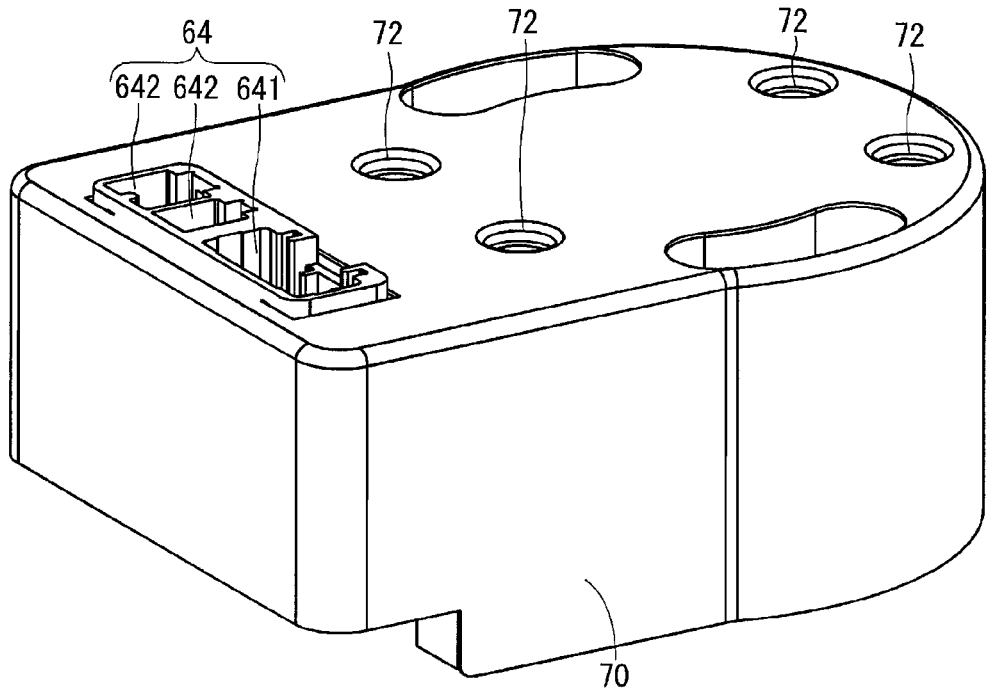
FIG. 10 is a schematic perspective view showing the control unit of the driving apparatus.
Figure 11:
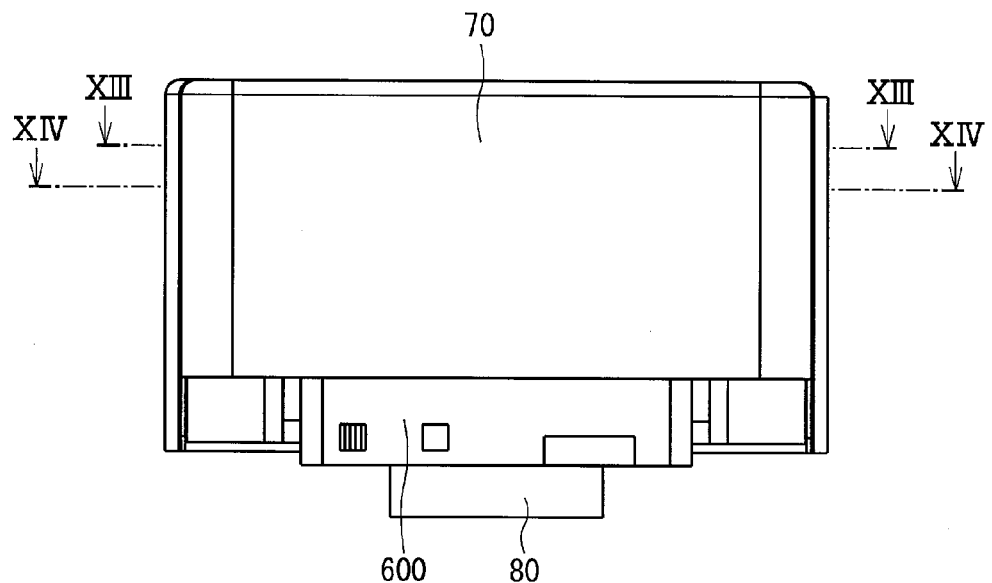
FIG. 11 is a schematic side view showing a control unit of a driving apparatus according to a second embodiment of the present disclosure.
Figure 12:
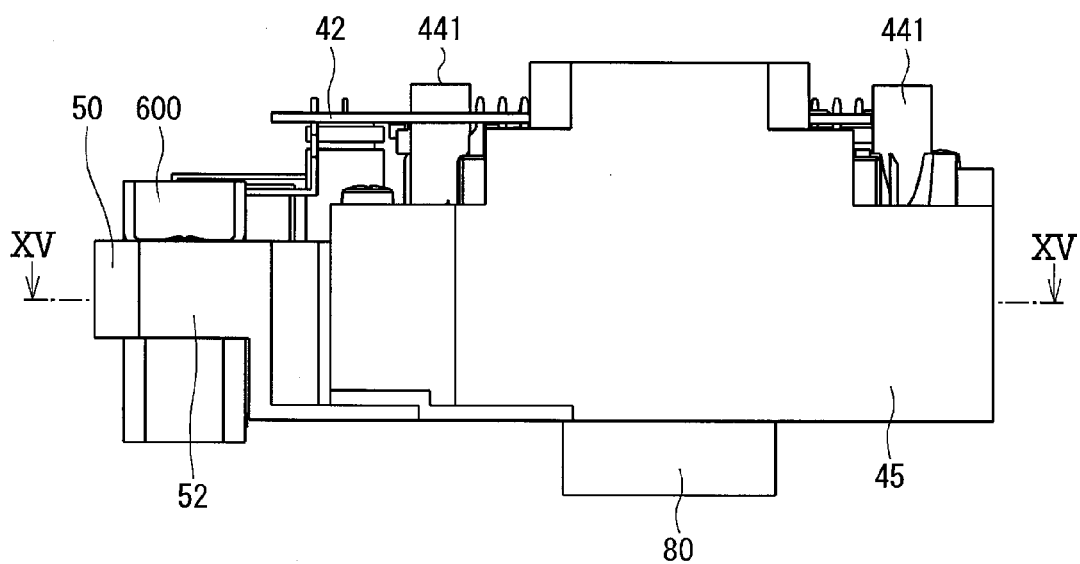
FIG. 12 is a schematic side view showing the control unit of the driving apparatus, in a condition that an upper-side cover member is removed.
Figure 13:
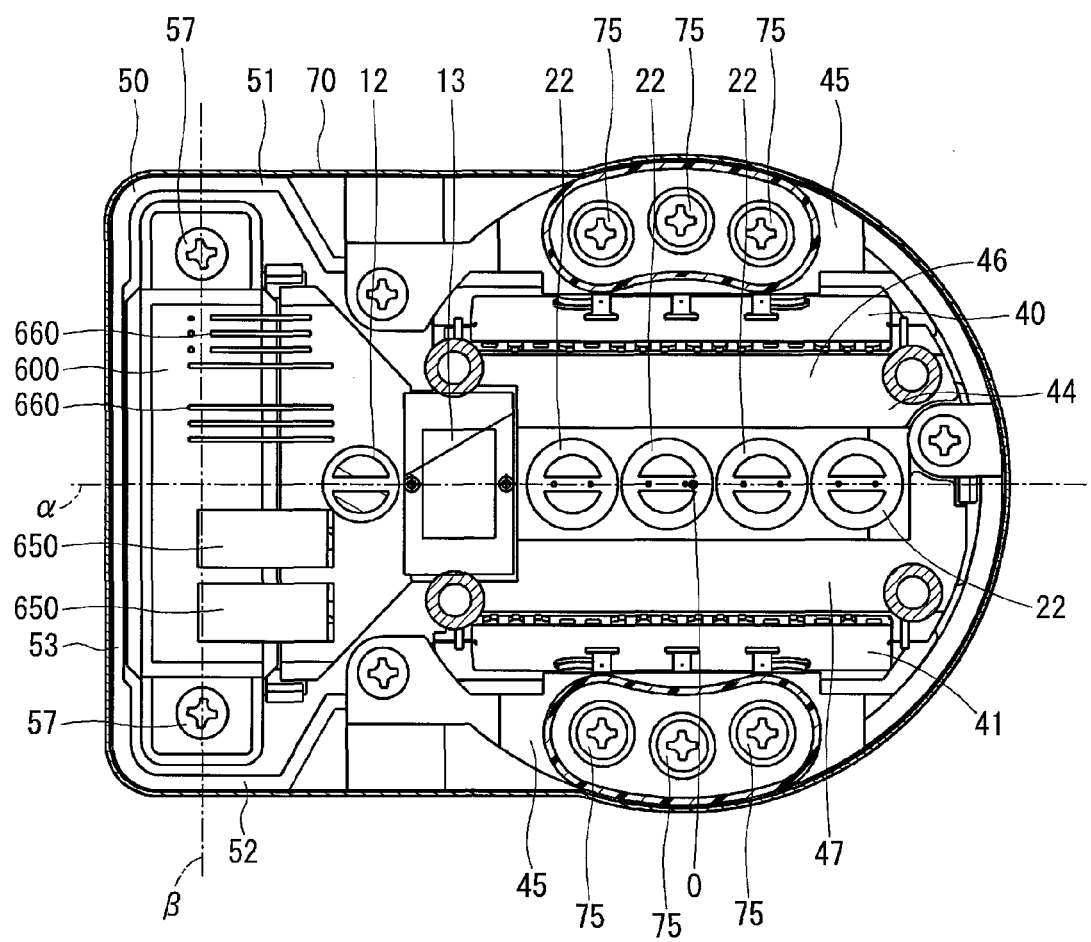
FIG. 13 is a cross sectional view taken along a line XIII-XIII in FIG. 11.

The lower-side cover member 80 is fixed to the heat sink 44. As shown in FIG. 10, the upper-side cover member 70 is finally covered to the heat sink 44, to which the above parts for the circuit unit 10, the inside connector unit 60 and the lower-side cover member 80 have been fixed. As shown in FIGS. 3 to 5, the arm portions 51 and 52 as well as the connecting portion 53 are brought into contact with inner wall surfaces of the upper-side cover member 70, so that rigidity of the upper-side cover member 70 is increased.

Then, multiple through-bolts (not shown) are inserted into the respective through-holes 72 formed in the upper-side cover member 70, so that the upper-side cover member 70 and the heat sink 44 are fixed to the motor casing 90. Each of the through-bolts passes through respective cylindrical portions 441 of the heat sink 44 and are firmly fixed to the female screws (not shown) formed in the motor casing 90. Thus, the driving apparatus 1 is completed.

The present embodiment has the following advantages.

According to the present embodiment, the connector holding unit 50 has the connector accommodating space 56 with axial open ends in the axial direction of the motor casing 90. It is, therefore, possible to fix the inside connector unit 60 (having various kinds of shapes) to the connector holding unit 50, wherein the inside connector unit 60 has the openings 64 (the connector-insert holes 641 and 642) depending on a direction of an opening of the outside connector (that is, the vehicle-side connector) of the vehicle to which the driving apparatus 1 is mounted.

In the present embodiment, the inside connector unit 60 has the connector-insert holes 641 and 642 opening in the axial direction of the motor casing 90 opposite to the electric motor 2. However, as will be explained below in a second embodiment, it is possible to fix an inside connector unit to the connector holding unit 50, wherein the inside connector unit has an opening (a connector-insert hole) which is opened in the axial direction of the motor casing and toward the electric motor. Alternatively, as will be explained in a third embodiment, it is further possible to fix such an inside connector unit to the connector holding unit 50, wherein the inside connector unit has an opening (a connector-insert hole) which is opened in a radial outward direction of the motor casing.

According to the driving apparatus 1 of the present embodiment, the motor unit (the electric motor 2), the circuit unit 10 and the connector holding unit 50 are commonalized, on one hand. On the other hand, the inside connector unit can be changed depending on the direction of the opening of the outside connector (the vehicle-side connector). As above, it is possible to reduce a cost for manufacturing the driving apparatus 1.

According to the present embodiment, the inside connector unit 60 has the openings 64 (the connector-insert holes 641 and 642) opening in the axial direction of the motor casing 90 opposite to the electric motor 2. When the driving apparatus 1 of the present embodiment is mounted to the vehicle, in which the outside connector (the vehicle-side connector) is located in such a position corresponding to an axial side of the driving apparatus 1 and to the side of the control unit 3, it is not necessary to pull the wire for the outside connector. It is, therefore, possible to easily connect the outside connector to the inside connector unit 60 of the driving apparatus 1. In other words, it is possible to easily mount the driving apparatus 1 to the vehicle.

According to the present embodiment, the one flanged portion 62, the one ends of the control terminals 66, the one ends of the power terminals 65 and the other flanged portion 63 are arranged in the line on the virtual plane "β", which is parallel to the center axis "O" of the motor casing 90. The main connector body 61 is arranged in such a way that the side surfaces 67 of the main connector body 61 (the rectangular body) having the largest area among the side surfaces, are parallel to the center axis "O" of the motor casing 90. According to such a structure, a length of the connector holding unit 50, which extends from the circuit unit 10 in the radial outward direction, in other words, a length of the inside connector unit 60 outwardly projecting from the circuit unit 10 in the radial direction can be made smaller. Namely, the driving apparatus 1 can be made smaller in its size.

According to the present embodiment, the arm portions 51 and 52 are integrally formed with the heat sink 44. It is thereby possible to increase the rigidity of the connector holding unit 50. According to such a structure, a press force for the outside connector toward the inside of the openings 64 of the inside connector unit 60 can be increased, to thereby surely connect the outside connector to the inside connector unit 60. Since the components (the arm portions 51, 52 and the heat sink 44) are integrally formed, the number of parts and components can be reduced.

Furthermore, according to the present embodiment, the circuit unit 10, the connector holding unit 50 and the inside connector unit 60 are covered by the upper-side cover member 70 and the protecting plate 83 of the lower-side cover member 80. It is, therefore, possible to prevent extraneous material from entering into the inside of the circuit unit 10. In addition, since it is possible to prevent by the protecting plate 83 that the extraneous material may adhere to the connector terminals 65 and 66, the electric current do not flow by error from the connector terminals 65 and 66 to the electronic circuits.

Second Embodiment

A driving apparatus according to the second embodiment of the present disclosure will be explained with reference to FIGS. 11 to 22.

According to the second embodiment, an inside connector unit 600 is fixed to the connector holding unit 50. The inside connector unit 600 has openings 640 (connector-insert holes) to which the outside connectors (the vehicle-side connectors: not shown) will be connected. The openings 640 (the connector-insert holes) are opened in the axial direction of the motor casing 90 toward the electric motor 2.

Figure 18:
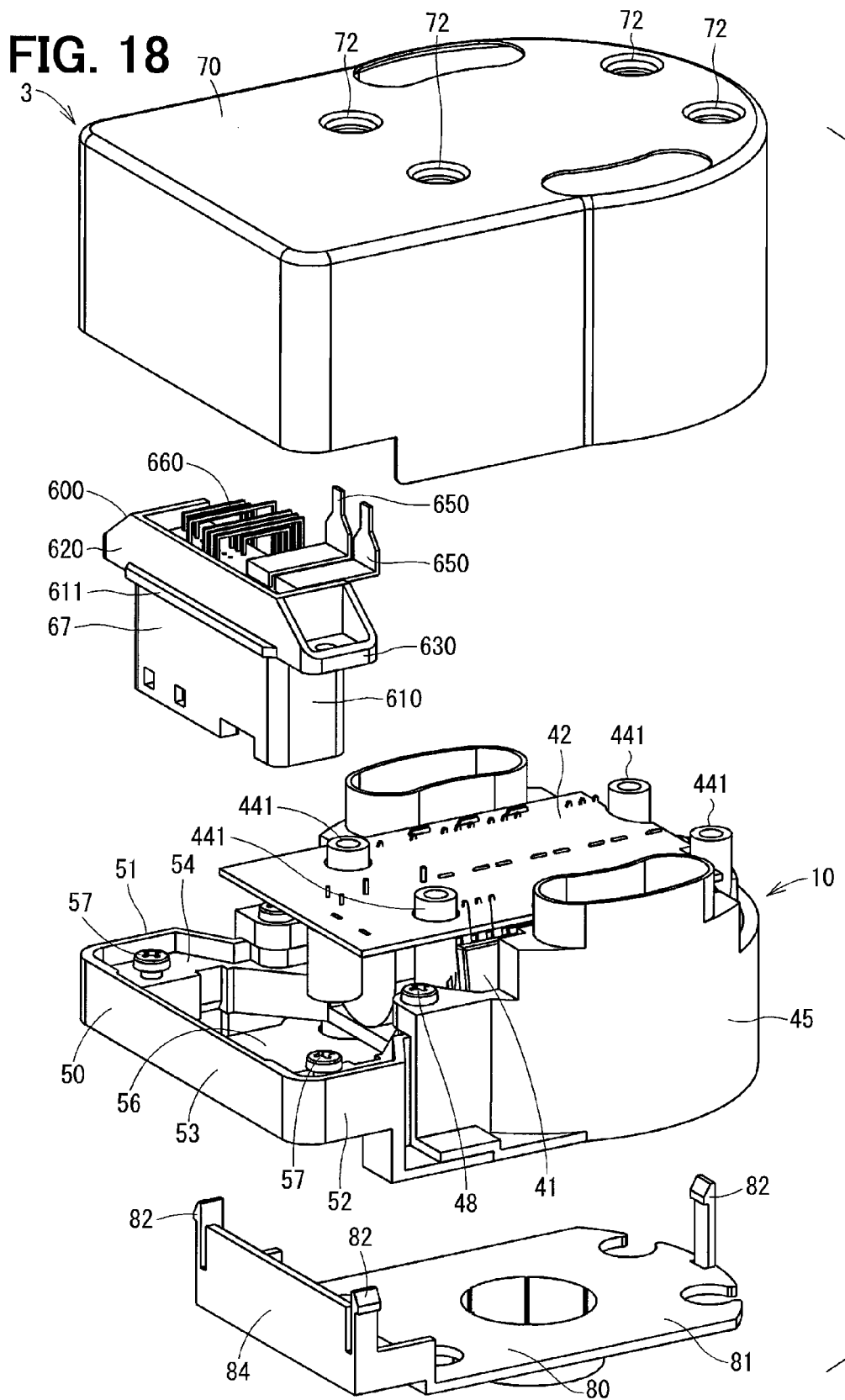
FIG. 18 is an exploded perspective view schematically showing the control unit of the driving apparatus according to the second embodiment.
Figure 19:
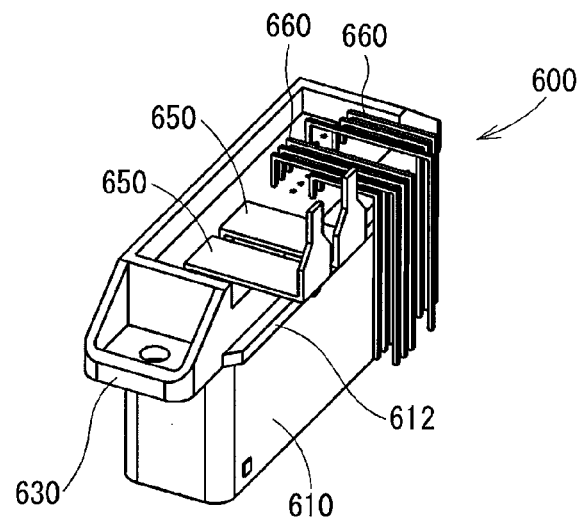
FIG. 19 is a schematic perspective view showing a relevant portion of an inside connector unit according to the second embodiment.
Figure 20:
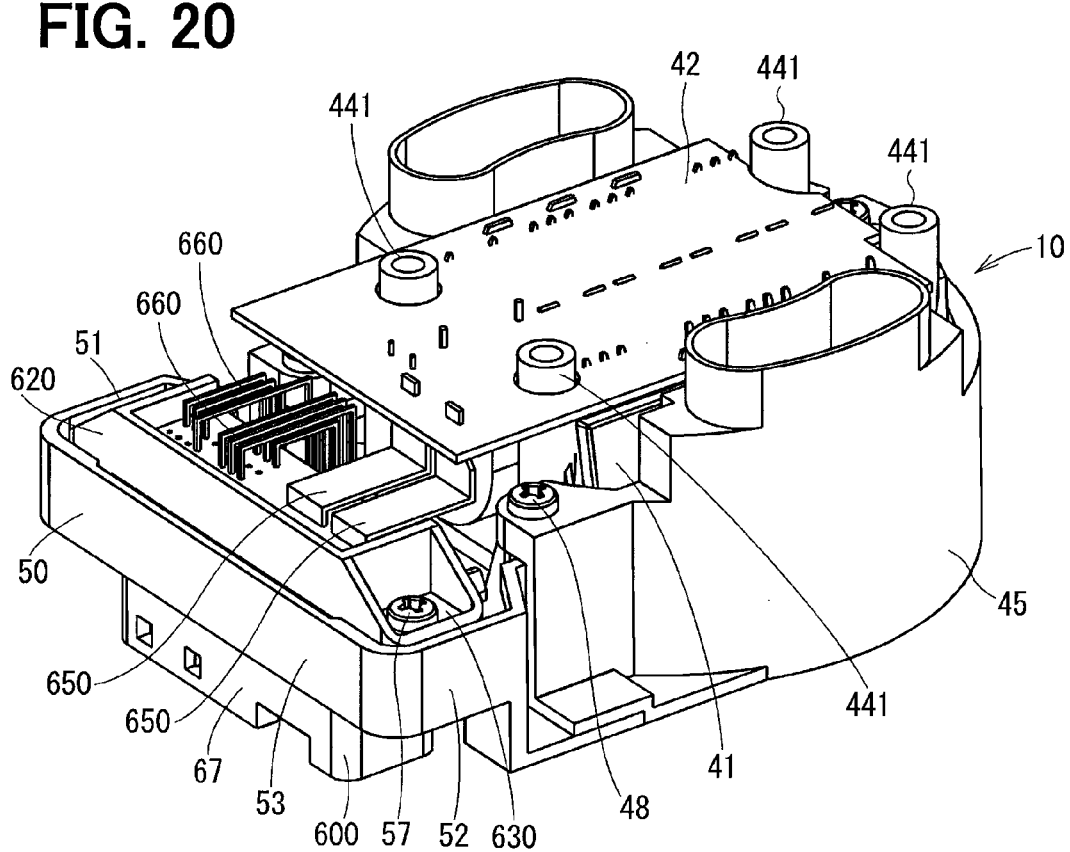
FIG. 20 is a schematic perspective view showing the circuit unit and the inside connector unit of the driving apparatus according to the second embodiment, wherein the inside connector unit is assembled to the circuit unit.

As shown in FIGS. 18 to 20, a pair of flanged portions 620 and 630 is integrally formed with a main connector body 610 at such a side of the main connector body 610 away from the electric motor 2 in the axial direction of the motor casing 90. As a result, the main connector body 610 (more exactly, a lower end of the main connector body 610) is outwardly projected from the connector holding unit 50 in the axial direction toward the electric motor 2.

The main connector body 610 has a first and a second projection 611 and 612, each of which is extending in a plane perpendicular to the center axis "O" of the motor casing 90. The first projection 611 is in contact with a stepped portion 58 formed in the connector holding unit 50, while the second projection 612 is in contact with an upper end of a second protecting plate 84, which extends upwardly from the lower-side cover member 80 in a direction perpendicular to the lower-side cover member 80.

Each of power terminals 650 is formed in a Z-letter shape. One end of each power terminal 650 is molded in the main connector body 610 and connected to the outside connector (not shown) in the inside of the main connector body 610, while each other end of the power terminal 650 is connected to the wiring patterns formed on the power circuit board 42. Each of control terminals 660 is formed in a U-letter shape. One end of each control terminal 660 is molded in the main connector body 610 and connected to the outside connector (not shown) in the inside thereof, while each other end of the control terminal 660 is connected to the wiring patterns formed on the control circuit board 43.

In the second embodiment, the upper-side cover member 70 does not have a through-hole corresponding to the through-hole 71 of the first embodiment.

A method for manufacturing the driving apparatus of the second embodiment will be explained with reference to FIGS. 18 to 22.

As shown in FIG. 18, each of the circuit unit 10 and the connector holding unit 50 has the same structure to those of the first embodiment. In addition, the structures of the circuit unit 10 and the connector holding unit 50 are identical to those of the third embodiment.

As shown in FIG. 20, the inside connector unit 600 is inserted into the connector accommodating space 56 of the connector holding unit 50. The flanged portions 620 and 630 of the inside connector unit 600 are fixed to the arm portions 51 and 52 of the connector holding unit 50 by the screws 57.

The lower-side cover member 80 is then fixed to the heat sink 44.

Figure 14:
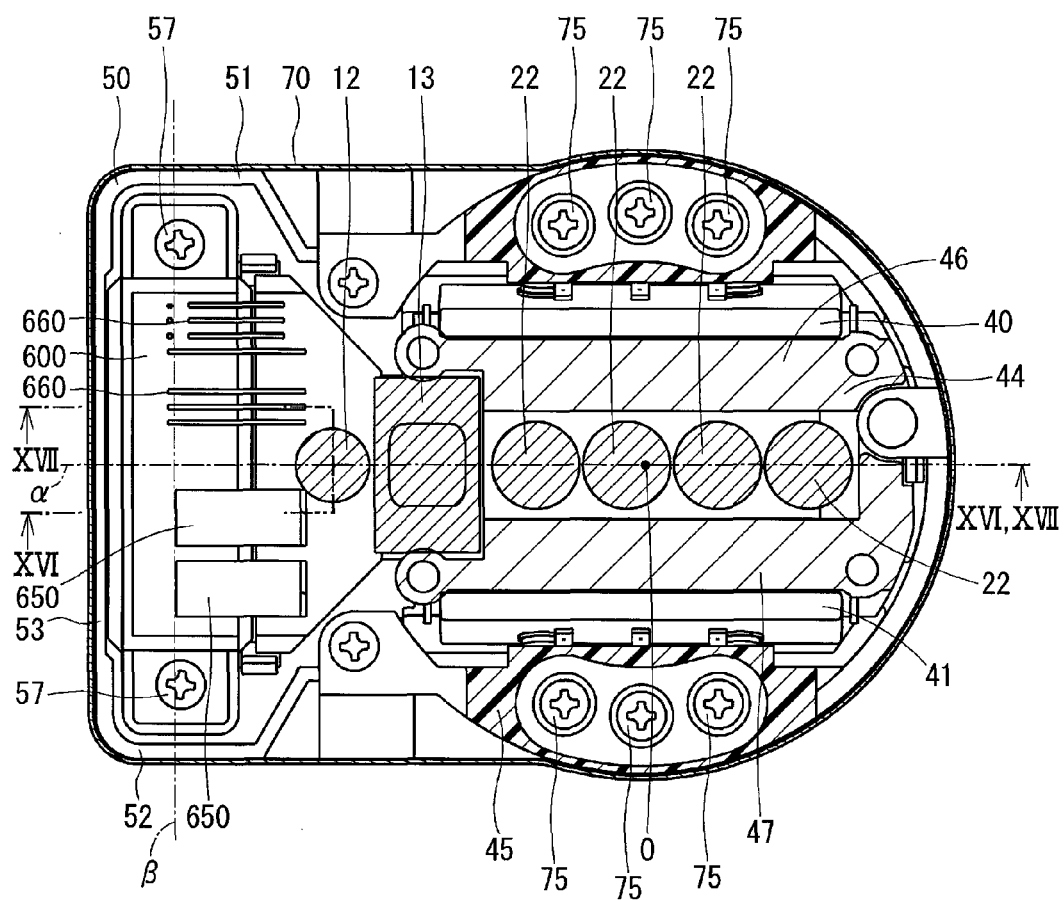
FIG. 14 is a cross sectional view taken along a line XIV-XIV in FIG. 11.
Figure 15:
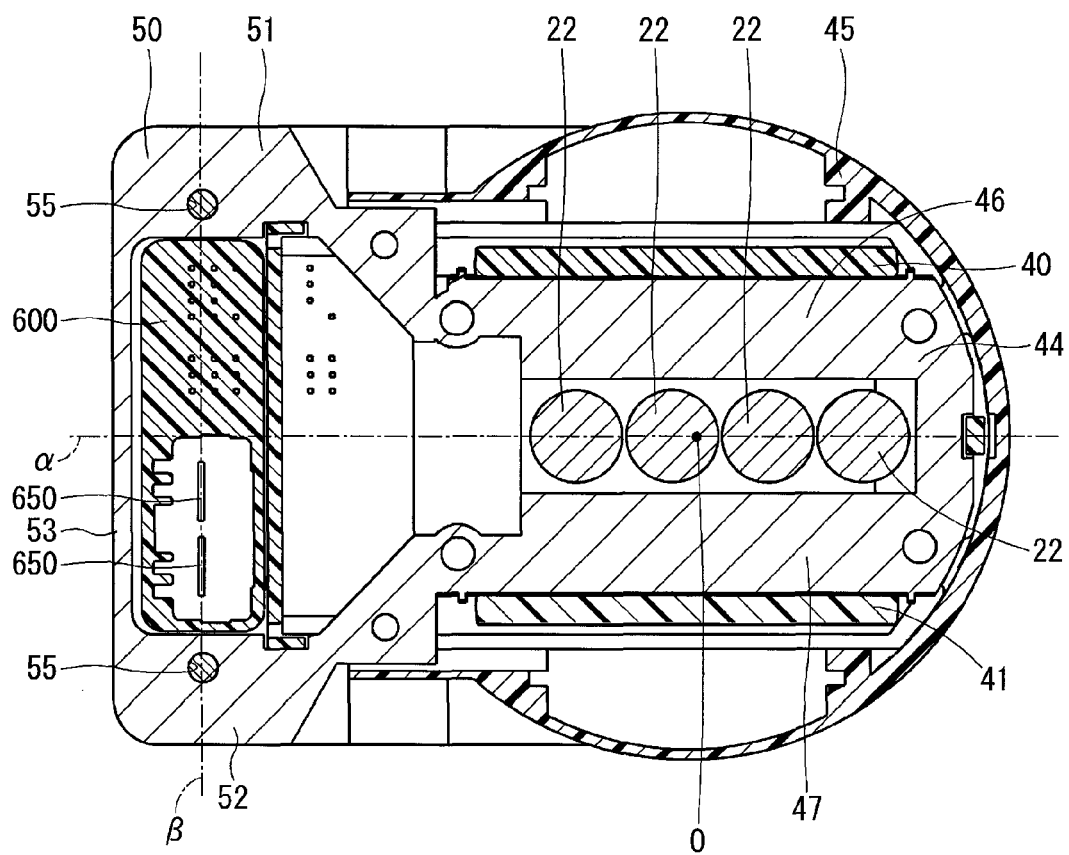
FIG. 15 is a cross sectional view taken along a line XV-XV in FIG. 12.
Figure 16:
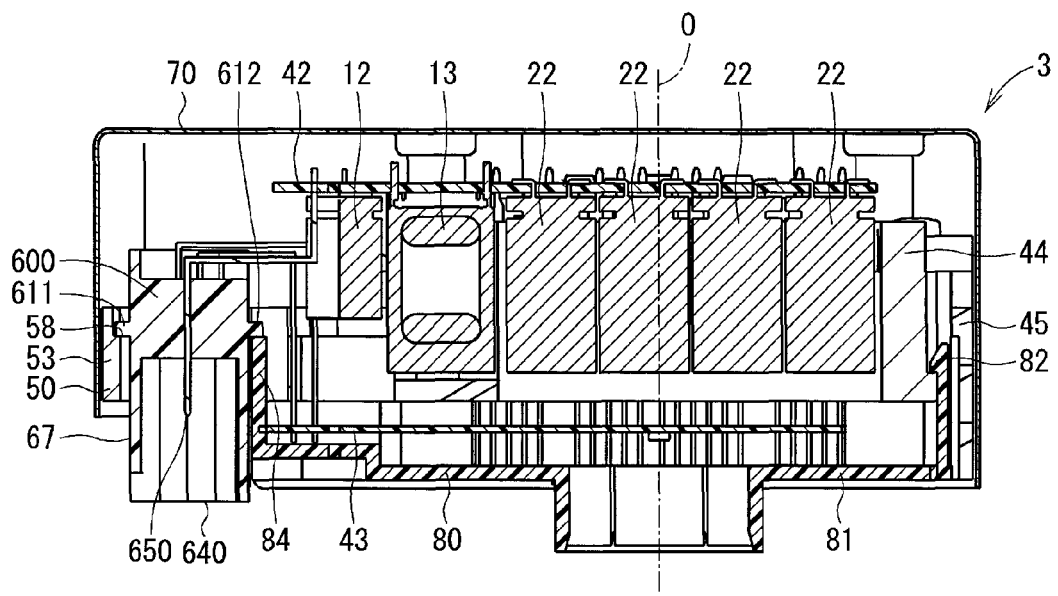
FIG. 16 is a cross sectional view taken along a line XVI-XVI in FIG. 14.
Figure 17:
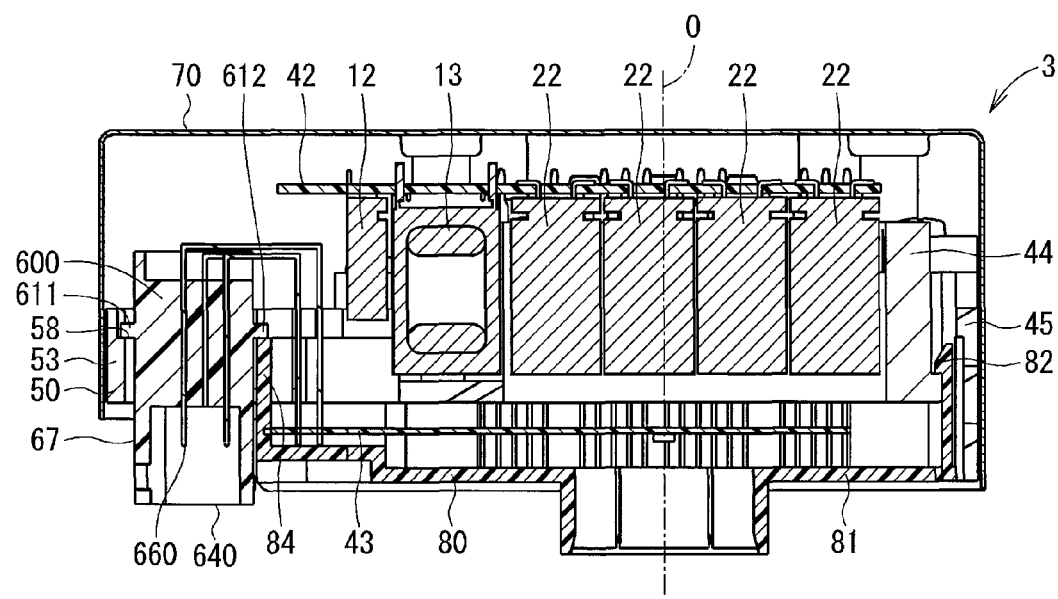
FIG. 17 is a cross sectional view taken along a line XVII-XVII in FIG. 14.
Figure 21:
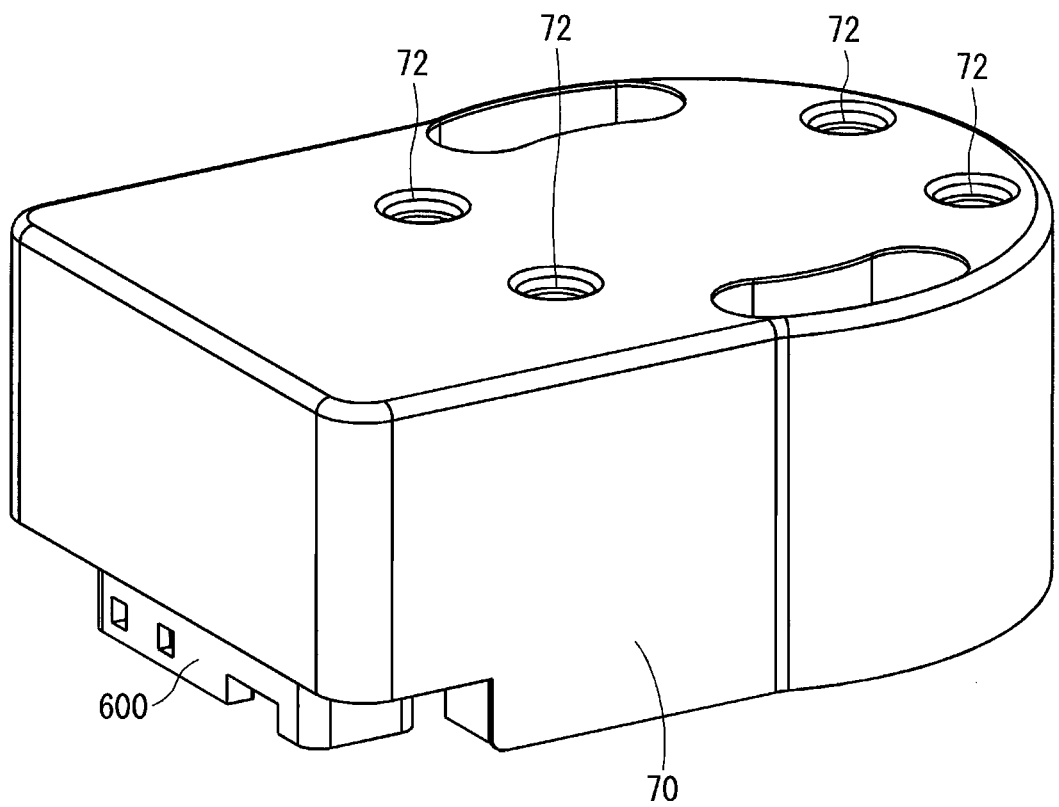
FIG. 21 is a schematic perspective view showing the control unit of the driving apparatus according to the second embodiment.

As shown in FIG. 21, the upper-side cover member 70 fixed to the heat sink 44, to which the circuit unit 10, the inside connector unit 600 and the lower-side cover member 80 have been fixed. As shown in FIGS. 14, 16 and 17, the arm portions 51 and 52 as well as the connecting portion 53 of the connector holding unit 50 are brought into contact with inner wall surfaces of the upper-side cover member 70.

Figure 22:
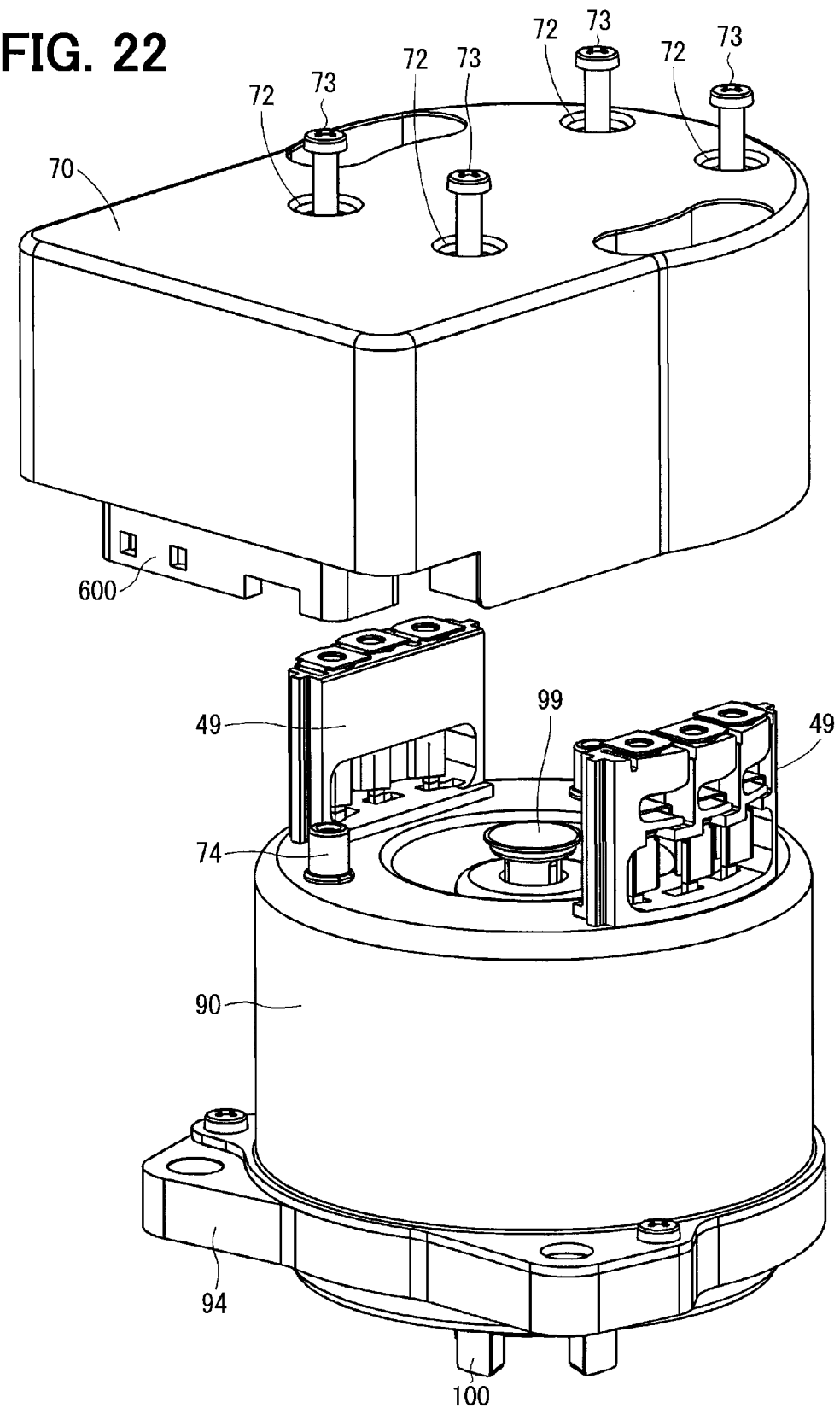
FIG. 22 is an exploded perspective view schematically showing the control unit and the motor unit of the driving apparatus according to the second embodiment.

Then, as shown in FIG. 22, multiple through-bolts 73 are inserted into the respective through-holes 72 formed in the upper-side cover member 70 and screwed into female screws 74 formed in the motor casing 90, so that the upper-side cover member 70 and the heat sink 44 are fixed to the motor casing 90. In this assembling process, terminal holders 49 (which hold motor terminals electrically connected to the windings 95 of the electric motor 2) are inserted into the inside of the component carrier 45 of the circuit unit 10. And as shown in FIG. 14, multiple screws 75 are inserted from an outside of the upper-side cover member 70 into respective recessed portions formed in the upper-side cover member 70, and each screw 75 is fastened to each terminal supporting portion, so that each circuit-board terminal (not shown) is mechanically and electrically connected to each motor terminal (not shown). As above, the driving apparatus is completed.

The present embodiment has the following advantages.

According to the second embodiment, in the same manner to the first embodiment, the motor unit (the electric motor 2), the circuit unit 10 and the connector holding unit 50 are commonalized, on one hand. On the other hand, the inside connector unit 600 can be changed depending on the direction of the opening of the outside connector (the vehicle-side connector). Accordingly, a manufacturing cost for the driving apparatus can be reduced.

According to the present embodiment, the inside connector unit 600 has the openings 640 (the connector-insert holes) opening in the axial direction of the motor casing 90 and toward the electric motor 2. Therefore, when the driving apparatus of the present embodiment is mounted to the vehicle, in which the outside connector (the vehicle-side connector) is located in such a position corresponding to the axial side of the driving apparatus and to the side of the electric motor 2, it is not necessary to pull the wire for the outside connector. It is, therefore, possible to easily connect the outside connector to the inside connector unit 600 of the driving apparatus.

According to the second embodiment, like the first embodiment, the connector accommodating space 56 of the connector holding unit 50 is formed at such a position, which corresponds to an outside space in the radial direction of the motor casing 90. It is thereby possible to insert the outside connector into the inside connector unit 600 from the outside space of the motor unit.

In the second embodiment, the first projection 611 of the main connector body 610 is brought into contact with the stepped portion 58, while the second projection 612 is brought into contact with the second protecting plate 84. According to such a structure, the circuit unit 10, the connector holding unit 50 and the inside connector unit 600 are blocked out from the outside, in order to prevent the extraneous material from entering into the inside of the circuit unit 10. It is further possible to prevent the electric current from flowing to the electronic circuits as a result that the extraneous material is adhered to the connector terminals 650 and 660.

Third Embodiment

Figure 23:
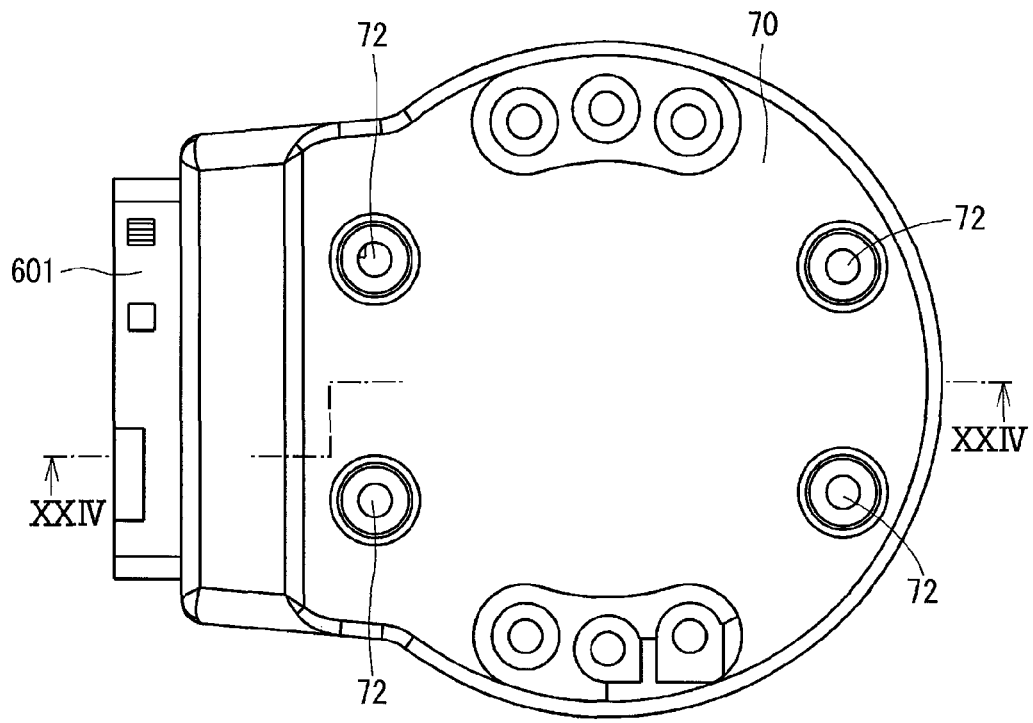
FIG. 23 is a schematic plane view showing a control unit of a driving apparatus according to a third embodiment of the present disclosure.
Figure 24:
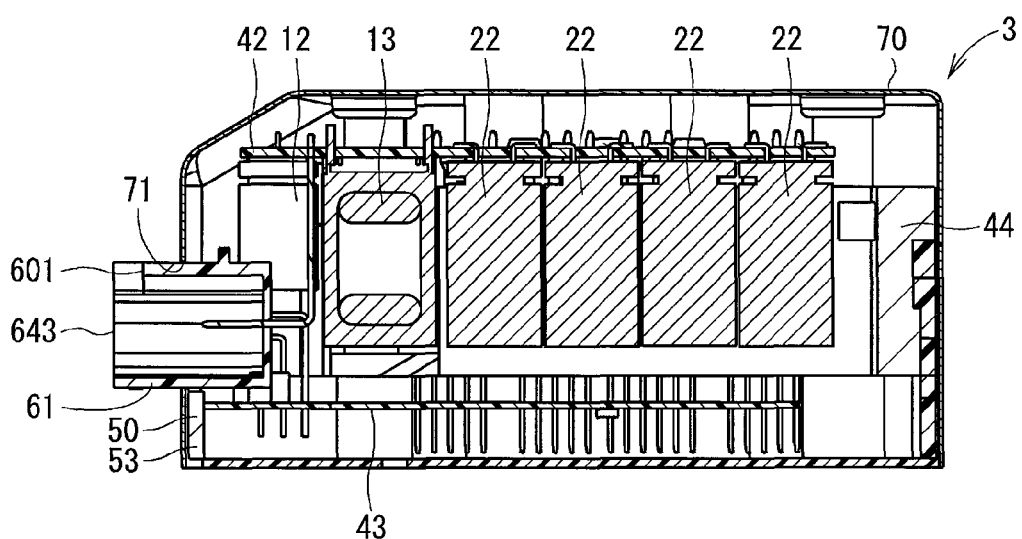
FIG. 24 is across sectional view taken along a line XXIV-XXIV in FIG. 23.

A driving apparatus according to the third embodiment of the present disclosure will be explained with reference to FIGS. 23 and 24.

According to the third embodiment, an inside connector unit 601 is fixed to the connector holding unit 50. The inside connector unit 601 has openings 643 (connector-insert holes) to which the outside connectors will be connected. The openings 643 (the connector-insert holes) are opened in the radial direction of the motor casing 90. The main connector body 61 of the inside connector unit 601 is in contact with an upper end of the connecting portion 53, which corresponds to an axial end of the connecting portion 53 on a side opposite to the electric motor 2. The main connector body 61 passes through the through-hole 71 formed in the upper-side cover member 70 and outwardly projects in the radial direction of the motor casing 90.

As explained already, the circuit unit 10 and the connector holding unit 50 of the control unit 3 are identical to those of the first and second embodiments.

The present embodiment has the following advantages.

According to the third embodiment, in the same manner to the first embodiment, the motor unit (the electric motor 2), the circuit unit 10 and the connector holding unit 50 are commonalized, on one hand. On the other hand, the inside connector unit 601 can be changed depending on the direction of the opening of the outside connector (the vehicle-side connector). Accordingly, a manufacturing cost for the driving apparatus can be reduced.

According to the present embodiment, the inside connector unit 601 has the openings 643 (the connector-insert holes) opening in the radial direction of the motor casing 90. Therefore, when the driving apparatus of the present embodiment is mounted to the vehicle, in which the outside connector (the vehicle-side connector) is located in such a position corresponding to a radial side of the driving apparatus, it is not necessary to pull the wire for the outside connector. It is, therefore, possible to easily connect the outside connector to the inside connector unit 601 of the driving apparatus.

(Further Modifications)

In the above embodiments, the connector holding unit and the heat sink are integrally formed with each other. However, in one of modifications, the connector holding unit and the component carrier may be integrally formed with each other. In another modification, the component carrier is made of resin, while the connector holding unit may be made of metal, wherein the component carrier and the connector holding unit may be fixed to each other by means of bolts or the like.

In addition, the power circuit board or the control circuit board may be fixed to the connector holding unit by means of bolts or the like.

In the above embodiments, the inside connector unit is fixed to the connector holding unit. In a further modification, the connector holding unit is removed, and instead a part of the control circuit board is extended in the radial outward direction, so that such part is projected outwardly from the motor casing. Then, the inside connector unit may be directly attached to such extended part of the control circuit board on a side to the electric motor or on another side opposite to the electric motor.

As above, the present disclosure should not be limited to the above embodiments but may be modified in various manners without departing from the spirit of the present disclosure.

What is claimed is:
1. A driving apparatus comprising:
   a motor unit having:
      a cylindrical motor casing for forming an outer frame,
      a stator provided in a radial inside of the motor casing and having multiple-phase windings wound on the stator, and
      a rotor rotatably accommodated in a radial inside of the stator;
   a circuit unit attached to an axial end of the motor casing and having:
      driving elements for supplying electric power to the windings of the stator,
      a heat sink for absorbing heat generated at the driving elements, and
      circuit boards having electronic circuits electrically connected to the driving elements;
   a connector holding unit having:
      a first and a second arm portions extending from the circuit unit in a radial outward direction thereof,
      a connecting portion for connecting the first and second arm portions with each other, and
      a connector accommodating space, which is formed in the first and second arm portions and the connecting portion and which extends in an axial direction of the motor casing;

an inside connector unit fixed to the connector holding unit having a connector-insert hole, which is opened in the axial or radial direction of the motor casing and to which an outside connector is connected in order that electric power is supplied from an outside power source or control signals are supplied from an outside electronic apparatus to the electronic circuits, wherein the inside connector unit is inserted into the connector accommodating space at such a position, which is located at an outside of the motor casing in the radial direction thereof;

an upper-side cover member attached to one axial end of the circuit unit, which is on a side opposite to the motor unit, the upper-side cover member covering the circuit unit, the connector holding unit and the inside connector unit from the one axial end; and a lower-side cover member attached to the other axial end of the circuit unit, which is on a side closer to the motor unit, the lower-side cover member covering the circuit unit, the connector holding unit and the inside connector unit from the other axial end, wherein the inside connector unit has the connector-insert hole, which is opened in the axial direction of the motor casing away from the motor unit, the upper-side cover member has a through-hole through which the connector main body passes, and the lower-side cover member has a protecting cover plate for closing the connector accommodating space so as to protect the connector terminals.

2. The driving apparatus according to claim 1, wherein the first and second arm portions as well as the connecting portion of the connector holding unit are brought into contact with inner wall surfaces of the upper-side cover member.

3. A driving apparatus comprising:
a motor unit having:
   a cylindrical motor casing for forming an outer frame,
   a stator provided in a radial inside of the motor casing and having multiple-phase windings wound on the stator, and
   a rotor rotatably accommodated in a radial inside of the stator;
a circuit unit attached to an axial end of the motor casing and having:
   driving elements for supplying electric power to the windings of the stator,
   a heat sink for absorbing heat generated at the driving elements, and
   circuit boards having electronic circuits electrically connected to the driving elements;
a connector holding unit having:
   a first and a second arm portions extending from the circuit unit in a radial outward direction thereof,
   a connecting portion for connecting the first and second arm portions with each other, and
   a connector accommodating space, which is formed in the first and second arm portions and the connecting portion and which extends in an axial direction of the motor casing;
an inside connector unit fixed to the connector holding unit having a connector-insert hole, which is opened in the axial or radial direction of the motor casing and to which an outside connector is connected in order that electric power is supplied from an outside power source or control signals are supplied from an outside electronic apparatus to the electronic circuits, wherein the inside connector unit is inserted into the connector accommodating space at such a position, which is located at an outside of the motor casing in the radial direction thereof; and
an upper-side cover member attached to one axial end of the circuit unit, which is on a side opposite to the motor unit, the upper-side cover member covering the circuit unit, the connector holding unit and the inside connector unit from the one axial end,
wherein the inside connector unit has the connector-insert hole, which is opened in the axial direction of the motor casing toward the motor unit.

* * * * *